United States Patent
Kobayashi et al.

(10) Patent No.: US 7,829,154 B2
(45) Date of Patent: Nov. 9, 2010

(54) PARTICLE DEPOSITION APPARATUS, PARTICLE DEPOSITION METHOD, AND MANUFACTURING METHOD OF LIGHT-EMITTING DEVICE

(75) Inventors: Satoshi Kobayashi, Tokyo (JP); Yuki Iguchi, Tokyo (JP)

(73) Assignee: Hoya Corporation, Tokyo (JP)

(*) Notice: Subject to any disclaimer, the term of this patent is extended or adjusted under 35 U.S.C. 154(b) by 729 days.

(21) Appl. No.: 11/665,735

(22) PCT Filed: Oct. 21, 2005

(86) PCT No.: PCT/JP2005/019377
§ 371 (c)(1),
(2), (4) Date: Jun. 26, 2007

(87) PCT Pub. No.: WO2006/043656
PCT Pub. Date: Apr. 27, 2006

(65) Prior Publication Data
US 2009/0093105 A1    Apr. 9, 2009

(30) Foreign Application Priority Data
Oct. 21, 2004   (JP)   .............................. 2004-307226

(51) Int. Cl.
*B05D 1/06* (2006.01)
*B05B 5/16* (2006.01)
(52) U.S. Cl. .................. 427/483; 427/294; 427/598; 118/623; 118/625; 118/634
(58) Field of Classification Search .............. 427/294, 427/483, 598; 118/623, 625, 634
See application file for complete search history.

(56) References Cited

U.S. PATENT DOCUMENTS 4,559,096 A * 12/1985 Friedman et al. ......... 156/272.2

(Continued)

FOREIGN PATENT DOCUMENTS

JP    A 62-169319    7/1987

(Continued)

OTHER PUBLICATIONS

M Danek et al., "Electrospray organometallic chemical vapor deposition—A novel technique for preparation of II-Vi quantum dot Composites," Appl. Phys. Lett. vol. 65 No. 22, 1994, pp. 2795-2797.

(Continued)

*Primary Examiner*—Frederick J Parker
(74) *Attorney, Agent, or Firm*—Oliff & Berridge, PLC

(57) ABSTRACT

To provide a (homogeneous) particle deposit without any impurity contamination, on which only particles with a desired size are deposited. A solution, with particles dispersed in a solvent, is jetted as a flow of fine liquid droplets from a tip part of a capillary, and the jetted fine liquid droplets are electrically charged. This flow of the droplets is introduced into a vacuum chamber through a jet nozzle, as a free jet flow. The free jet flow that travels in the vacuum chamber is introduced into an inside of a deposition chamber, inside of which is set at lower pressure, through a skimmer nozzle provided in the deposition chamber, as an ion beam. Subsequently, by an energy separation device, only particles having particular energy are selected from the electrically charged particles in the flow, and are deposited on a deposited body disposed in an inside of the deposition chamber.

16 Claims, 12 Drawing Sheets

U.S. PATENT DOCUMENTS

| | | | |
|---|---|---|---|
| 4,770,738 | A | 9/1988 | Robillard |
| 5,015,845 | A | 5/1991 | Allen et al. |
| 5,965,212 | A | 10/1999 | Dobson et al. |
| 6,280,802 | B1 | 8/2001 | Akedo et al. |
| 2003/0122090 | A1 | 7/2003 | Tsukihara et al. |
| 2005/0230642 | A1* | 10/2005 | Halling et al. ......... 250/492.21 |

FOREIGN PATENT DOCUMENTS

| | | |
|---|---|---|
| JP | A-64-022364 | 1/1989 |
| JP | A 2-189159 | 7/1990 |
| JP | A 5-62896 | 3/1993 |
| JP | A 7-30151 | 1/1995 |
| JP | A 7-86164 | 3/1995 |
| JP | A 11-510314 | 9/1999 |
| JP | A 11-354843 | 12/1999 |
| WO | WO 97/04906 | 2/1997 |

OTHER PUBLICATIONS

C. Petit et al., "Three dimensional arrays of cobalt nanocrystals: Fabrication and magnetic properties," Journal of Applied Physics, vol. 91, No. 3, 2002, pp. 1502-1508.

C. Petit, "Magnetic properties of cobalt and cobalt-platinum nanocrystals investigated by magneto-optical Kerr effect," Journal of Applied Physics, vol. 95, No. 8, 2004, pp. 4251-4260.

M. Danek et al.: "Electrospray Oranometallic Chemical Vapor Deposition—A Novel Technique for Prepapration of II-VI Quantum Dot Composites" Appl. Phys. Lett., vol. 65, 1994, pp. 2795-2797, XP002477187.

* cited by examiner

PARTICLE DEPOSITION APPARATUS, PARTICLE DEPOSITION METHOD, AND MANUFACTURING METHOD OF LIGHT-EMITTING DEVICE

TECHNICAL FIELD

The present invention relates to a particle deposition apparatus and a particle deposit manufacturing method, which deposit particles on a substrate and the like in a case of manufacturing an inorganic film, such as a semiconductor film, a magnetic film and an optical film, on which particles such as quantum dots and magnetic particles are uniformly dispersed or deposited, and relates to a manufacturing method of a light-emitting device.

BACKGROUND ART

Conventionally, as semiconductor light-emitting devices, there are a pn-type light-emitting device, a pin-type light-emitting device, a quantum dot dispersion-type light emitting device (including a quantum well, a quantum wire, and the like), and the like. Among them, the quantum dot dispersion-type light-emitting device has attracted attention in terms of a low-dimensional structure. The quantum dot dispersion-type light-emitting device is manufactured by a method such as the self-assemble quantum dot forming method according to the Stranski-Krastnow mode (for example, refer to Patent Document 1), by the lithography method and the etching method (for example, refer to Patent Document 2), the self-assemble quantum dot forming method using a surface treatment (for example, Patent Document 3), or the like.

Meanwhile, there has been known a method of manufacturing a photoluminescence light-emitting material, in which quantum dots formed of CdSe nanocrystals (NCs) are dispersed into an amorphous or polycrystalline ZnSe matrix by the ES-OMCVD method (Non-Patent Document 1). Here, ZnSe is a material in which a band gap is wider than that of CdSe, and energy levels of a conduction band-edge and valence band-edge of ZnSe are above and below those of CdSe, respectively. Accordingly, the photoluminescence light-emitting material is constructed into a structure in which minute CdSe crystals are surrounded by the ZnSe matrix. In such a way, ZnSe plays a role to increase radiative recombination probability of electrons and holes in the CdSe crystals.

Patent Document 1: Japanese Patent Laid-Open Publication No. H05-62896

Patent Document 2: Japanese Patent Laid-Open Publication No. H07-30151

Patent Document 3: Japanese Patent Laid-Open Publication No. H11-354843

Non-Patent Document 1: Appl. Phys. Lett., Vol. 65, No. 22, 1994, p. 2795-2797

DISCLOSURE OF THE INVENTION

Problems to be Solved by the Invention

The methods described in Patent documents 1 to 3 and the like are problematic in that the manufacturing methods concerned are complicated, it is difficult to control a size of the quantum dots, materials of the quantum dots and the matrix are limited in terms of characteristics of the manufacturing methods, light emission efficiency of the obtained quantum dots is not high, and so on, and have not been put into practical use.

Moreover, Non-Patent Document 1 describes a light-emitting material that emits light caused by transition in CdSe between 1s-1s quantized levels, with respect to emitted light. A wavelength of the emitted light is determined in accordance with a size of the NCs. Accordingly, the NCs in Non-Patent Document 1 aggregate and vary in size, and therefore, a light emission spectrum thereof is broadened. In Non-Patent Document 1, the NCs of CdSe and the ZnSe matrix are formed by the OMCVD method. Specifically, a solution, with the NCs of CdSe dispersed in a mixed solvent of toluene and acetonitrile is introduced into a reactor by an electrospray (ES) method, and is reacted with $H_2Se$ and diethyl-Zn which are introduced by using hydrogen as carrier gas, and a ZnSe/CdSe film is thus formed.

Here, in Non-Patent Document 1, the observed light emission is photoluminescence, and this is another light emission phenomenon having a generation mechanism different from that of electroluminescence required for the light-emitting diode. An influence on the light emission by crystallinity of the amorphous or polycrystalline ZnSe matrix located on the periphery of CdSe is smaller as compared with an influence on the electroluminescence. ZnSe in Non-Patent Document 1 is located so as to surround CdSe, and plays a role to construct energy well walls of the CdSe quantum dots, and the composition and crystallinity of ZnSe itself hardly affects the light emission efficiency of CdSe. Impurities such as hydrogen derived from carrier gas and carbon, being a ZnSe precursor, contaminate the ZnSe/CdSe film formed by the method described in Non-Patent Document 1. However, the photoluminescence in Non-Patent Document 1 is observed with high intensity since the photoluminescence occurs by pair creation and pair recombination of carriers in the CdSe crystals.

Meanwhile, in the case of applying Non-Patent Document 1 to manufacture of the light-emitting diode, there is a problem that a transition of the carriers is inhibited by the presence of the impurities (C, H, and the like) mixed into the ZnSe matrix. By the fact that the transfer of the carriers is inhibited, the light emission efficiency is significantly decreased, electric conductivity is restricted, and desired characteristics cannot be obtained. Here, Non-Patent Document 1 describes that N and P which are derived from TOP (hydrocarbon side chains located on the periphery of CdSe) are not detected by an Auger electron spectroscope. However, while a detectable limit of the Auger electron spectroscope is 0.1%, it is necessary in the electroluminescence that such impurities is 0.01% or less owing to a light emission mechanism of the electroluminescence, where the carriers need to transfer. In order to achieve such a low content of the impurities, a method of desorbing alkyl chains and the like by increasing a substrate temperature (for example, 400° C. or more) is considered. However, the quantum well structure of CdSe and ZnSe is degraded by the interdiffusion of the constituent elements, and it becomes impossible to obtain desired light emission intensity. Moreover, the value of the wavelength of the emitted light, which must have been determined by the transition between the quantized levels, is different from a desired value. Originally, the CVD method requires a high deposition temperature and a thermal treatment after the deposition, and accordingly, is not suitable for the electroluminescence.

The present invention is provided based on the technical background as described above. An object of the present invention is to provide a particle deposition apparatus, and a particle deposit manufacturing method, which are capable of manufacturing a particle-dispersed film in which particles with a desired size are uniformly dispersed into a monocrystalline, polycrystalline or amorphous homogeneous inorganic film free from impurities, and to provide a light-emitting device. Another object of the present invention is to provide a particle deposition apparatus for depositing particles with a desired size on a deposited body, and a particle deposit manufacturing method using the particle deposition apparatus.

Means for Solving the Problems

In order to solve the above-described problems, first means is a particle deposition apparatus for depositing particles on a deposited body by using a solution, with particles dispersed in a solvent, as a source material, comprising:

a solution supply device that supplies the source material;

a charging device that electrically charges the source material;

a vacuum chamber having an evacuation port that sets inside thereof in a low pressure atmosphere, into which the source material jetted from the solution supply device can be introduced through a jet nozzle; and a deposition chamber having an evacuation port that sets an inside thereof in a reduced pressure than the inside of the reduced pressure chamber, into which the source material emitted from the vacuum chamber can be introduced through a skimmer nozzle, and also having a separation device disposed inside that selects only particles having a particular mass electric charge ratio from the source material and deposits such particles on a deposited body.

Second means is the particle deposition apparatus according to the first means, wherein the deposition chamber includes:

lens devices that collimate the source material electrically charged by the charging device: and the separation device that applies an electric field or a magnetic field to the source material collimated by the lens devices, and allows only the particles having the particular mass-charge ratio to travel in a direction of the deposited body so as to be deposited thereon.

Third means is the particle deposition apparatus according to either of the first or second means, wherein the charging device is a voltage applying unit that sets the solution supply device into a defined electric potential.

Fourth means is the particle deposition apparatus according to any one of the first to third means, wherein the charging device is a discharge voltage applying unit that applies a discharge voltage between the jet nozzle and the skimmer nozzle, to set the inside of the vacuum chamber to an electric discharge area.

Fifth means is the particle deposition apparatus according to any one of the first to fourth means, wherein the separation device is an electrostatic type energy separation device which is a trajectory deflection energy separation device using an electric field generating means.

Sixth means is the particle deposition apparatus according to any one of the first to fourth means, wherein the separation device is an electromagnetic field-type mass separation device which is a trajectory deflection mass separation device using a magnetic field generating means or an orthogonal electric and magnetic fields generating means.

Seventh means is the particle deposition apparatus according to any one of the first to fourth means, wherein the separation device is a high-frequency multipole type mass separation device.

Eighth means is the particle deposition apparatus according to any one of the first to seventh means, including a particle deceleration device that decelerates the particles traveling toward the deposited body from the separation device.

Ninth means is the particle deposition apparatus according to the eight means, including a particle converging device that converges the particles decelerated by the particle deceleration device and deposits the particles on the deposited body.

Tenth means is the particle deposition apparatus according to any one of the first to ninth means, wherein the deposition chamber is divided into an ion optics region in which the separation device is disposed and a high vacuum region in which the deposited body is disposed; the regions are partitioned by a partition wall having an aperture for allowing the particles to pass through; an evacuation device is provided for setting each region at a desired pressure; and a pressure in the high vacuum region is set lower than the pressure in the ion optics region.

Eleventh means is a semiconductor particle deposit manufacturing method, including the step of:

depositing semiconductor particles on a deposited body by using a solution, with particles dispersed in a solvent, and by using the particle deposition apparatus according to any one of the first means to tenth means.

Twelfth means is a particle deposit manufacturing method for depositing particles on a deposited body by using a solution with dispersed particles in a solvent, as a source material, including the steps of:

jetting the source material from a solution supply device, and electrically charging the source material;

introducing the source material to the inside, through a jet nozzle provided in a vacuum chamber inside of which is set to a reduced pressure atmosphere;

introducing a jet flow that travels in the vacuum chamber, through a skimmer nozzle provided in a deposition chamber inside of which is kept in a lower pressure than the inside of the vacuum chamber; and selecting only particles having a particular mass-charge ratio from the source material and depositing such particles on the deposited body disposed inside.

Thirteenth means is the particle deposit manufacturing method according to the twelfth means, wherein a capillary is used as a solution supply device, and the step of charging the source material is the step of jetting the solution into an atmosphere of atmospheric pressure from a tip part of the capillary as fine liquid droplets, and charging the fine liquid droplets jetted from the tip part of the capillary by setting the capillary into a prescribed electric potential.

Fourteenth means provides the particle deposit manufacturing method according to either of the twelfth or thirteenth means, wherein the step of electrically charging the source material is the step of setting the inside of the vacuum chamber to an electric discharge area and allowing the source material to pass through the vacuum chamber.

Here, the "source material" includes all substances attributable to the source material, such as electrically charged/ionized droplets made from the source material, and fragments of the source material (particles, solvents, ligands, which are deposition objects, aggregates of these deposition objects, and electrically charged/ionized deposition objects). Moreover, semiconductor particles are used as the particles, and simultaneously, a semiconductor matrix which forms quantum dots is used together with the semiconductor particles, thus making it possible to form a light-emitting device.

Furthermore, structures of a particle-dispersed film as another embodiment and its manufacturing method will be explained as follows.

(Structure 1)

A manufacturing method of a particle-dispersed film, comprising:

an ionization step of ionizing a solution in which 1 to 10 nm diameter particles having hydrocarbon side chains coordinated therein are dispersed into an organic solvent, and generating electrically charged droplets;

a step of introducing the electrically charged droplets into a deposition chamber;

a solvent removing step of removing a component of the solvent from the electrically charged droplets;

a side chain removing step of removing the side chains from the electrically charged droplets, and obtaining the particles;

a step of supplying a source material for forming an inorganic film into the deposition chamber; and a step of simultaneously supplying to the substrate, as the deposited body, the particles obtained by the solvent removing step and the side chain removing step, and the source material of the inorganic film, and forming the inorganic film with particles dispersed therein.

(Structure 2)

The manufacturing method of a particle-dispersed film according to Structure 1, wherein the ionization step includes a step of performing ionization by applying a voltage to the solution in atmospheric pressure.

(Structure 3)

The manufacturing method of a particle-dispersed film according to either of Structure 1 or 2, wherein the side chain removing step includes a step of allowing the electrically charged droplets to collide with a surface of the deposited body substrate.

(Structure 4)

The manufacturing method of a particle-dispersed film according to any one of Structures 1 to 3, wherein the side chain removing step includes a step of applying the voltage to the electrically charged droplets in the deposition chamber.

(Structure 5)

The manufacturing method of a particle-dispersed film according to any one of Structures 1 to 4, wherein the electrically charged droplets are supplied to a vacuum chamber set in a lower vacuum than the pressure of the deposition chamber before being introduced into the deposition chamber.

(Structure 6)

The manufacturing method of a particle-dispersed film according to Structure 5, wherein the side chain removing step includes a step of applying the voltage to the electrically charged droplets in the vacuum chamber, and further includes the step of applying a lower voltage in the deposition chamber than the voltage applied in the vacuum chamber.

(Structure 7)

The manufacturing method of a particle-dispersed film according to any one of Structures 1 to 6, wherein the source material of the inorganic film is dispersed in the organic solvent, as the particles having the hydrocarbon side chains coordinated therein.

(Structure 8)

The manufacturing method of a particle-dispersed film according to any one of Structures 1 to 7, wherein the particles are quantum dots, the particle-dispersed film is a light-emitting layer, and the particle-dispersed film is a light-emitting layer in a light-emitting diode.

(Structure 9)

A deposition apparatus, comprising:

voltage applying means;

a solution discharging means capable of discharging the solution from the tip part of a capillary;

a vacuum chamber located apart from the capillary and capable of injecting the solution discharged from the tip part of the capillary; and a deposition chamber that communicates with the vacuum chamber, set in a high vacuum state than the vacuum chamber, wherein the deposition chamber includes a substrate holding means, and magnetic field generating means.

In the above-described means, in the event of forming the inorganic film with desired particles uniformly dispersed therein, even in the case of using particles having the hydrocarbon side chains coordinated dispersed in the organic solvent as the source material of the aforementioned particles, it is possible to disperse or deposit only the particles in the inorganic film, without capturing components attributable to the solvent and the side chains in the solution.

Moreover, by using the solution as described above, it is possible to disperse in the inorganic film, particles with the same size as that of the particles in the solution. Accordingly, by preparing the solution in advance, it becomes possible to disperse particles with a size of several nanometers in the inorganic film with good reproducibility, which can not be realized by the conventional methods. In order to remarkably obtain such an advantage, the manufacturing method of the present invention is applied to a quantum dot dispersion type light-emitting diode, for example. Specifically, when, by using the manufacturing method of the present invention, quantum dots as the particles are dispersed in an inorganic material film formed of a material having ambipolar characteristics, and a light-emitting active layer is thus formed, the quantum dots exist in the matrix of the light-emitting layer as nanocrystals. Accordingly, it is possible to form a light-emitting diode in which the quantum dots as three-dimensional quantum wells are formed.

An explanation by using FIG. 5 is given to an example of the "solution with particles having coordinated hydrocarbon side chains dispersed in the organic solvent" used in the present invention. The particles are formed of nanocrystals with a size of 1.5 to 7.0 nm, and the side chains are formed of hydrocarbon compounds of about C5 to C30 (O, N, P, etc, may be included). Here, the particles may be nanocrystals formed of a single composition, or may be nanocrystals having a core-shell structure as shown in FIG. 5. In the case of the core-shell structure, a quantum dot material (such as CdSe, InP) is employed in a core portion, and a material same as the inorganic film material (such as ZnSe, ZnS) is employed in a shell portion, thus preferably further developing the dispersion of the particles in the inorganic film, (developing affinity of the particles with the inorganic film) and easily realizing three-dimensional quantum well characteristics of the quantum dots. In this case, a material having wider gaps than the material of the core portion as the quantum dots is used as the inorganic film material. However, it is mainly the inorganic film portion that realizes the three-dimensional quantum wells, and accordingly, the shell portion may be a thin film with a thickness of several atoms. In order to realize the three-dimensional quantum well characteristics of the quantum dots, it is necessary that such components (solvent, side chains, etc) as hindering a transfer of carriers do not exit between the quantum dots and the inorganic film material. Here, the hydrocarbon side chain positioned so as to surround a circumference of the particles (including the core-shell structure) is adsorbed on the particle not by such a strong bond as a covalent bond but by such a relatively weak bond as a coordinate bond. By surrounding the particles by the hydrocarbon side chain, mutual coalescence of the particles is prevented, and the particles can be dispersed in the organic solvent with a desired size.

As requirements required for the quantum dot-dispersion type light emitting diode, the following requirements are given.

a) The quantum dots should be dispersed without changing diameters of the quantum dots.

When this requirement is not satisfied, by the change of the diameters of the quantum dots, a desired emission color can not be obtained, and this is not a preferable situation.

b) The quantum dots should be dispersed in a wide-gap semiconductor so as to show the three-dimension quantum dot characteristics.

As an example of not satisfying this requirement, there is a case that the quantum dots (narrow-gap semiconductors) are not dispersed apart at a sufficient distance. In such a case, wave functions of the carriers in the quantum dot particles penetrate and are overlapped one another, and a quantum confinement does not occur, and accordingly, the quantum wells are not formed. Therefore, only characteristics of a mixture (merely mixed polycrystals) of "the narrow-gap semiconductors and the wide-gap semiconductors" are merely obtained. This is not preferable because light emission efficiency is low and the desired emission color cannot be obtained.

c) The carriers (electrons/holes) should be transferred in the inorganic film (matrix), with quantum dots dispersed therein.

When this requirement is not satisfied, transition and recombination of the electrons from the electron-injected electrode and the holes from the hole-injected electrode in the quantum dots are impossible, and light emission can not be obtained. As an example of not satisfying this requirement, there is a case that impurities are present in the inorganic film (such as "solvent" and "hydrocarbon chains" when the solution, with particles having coordinated hydrocarbon side chains dispersed in the organic solvent).

d) The light-emitting characteristics of the quantum dots should not be broken.

When this requirement is not satisfied, the light-emitting characteristics cannot be obtained. As an example of not satisfying this requirement, there is a case of a thermal breakage of the quantum dot material (change of crystallinity owing to a high-temperature treatment in the manufacturing process).

The present invention realizes the manufacture of the quantum dot-dispersion type light emitting diode that satisfies the above-described requirements. An example of the apparatus used in the present invention will be explained hereafter.

(1) Regarding Apparatus

An example of the apparatus used in the present invention is shown in FIG. 4. A particle-dispersed solution 1, with particles having coordinated hydrocarbon side chains dispersed in the organic solvent is sent to a capillary 3 by a microsyringe pump 2, and is released from a capillary tip part 3a. Note that, a prescribed voltage can be applied to the capillary 3 by voltage applying means 3b.

The particle dispersion released from the capillary tip part 3a is introduced into a vacuum chamber 4 through a jet nozzle 4a provided on an upstream tip part of the vacuum chamber 4, and is further introduced into a deposition chamber 5 through a skimmer nozzle 5a provided on the upstream tip part of the deposition chamber 5. The vacuum chamber 4 and the deposition chamber 5 can be set in prescribed different vacuum state by a vacuum pump 4d and a high vacuum pump 5d, etc. Moreover, in the deposition chamber 5, an electrostatic lens 6, magnetic field generating means 7, and holding means 8a for holding a substrate 8 are provided in an order from the upstream side so that reference axes of them can coincide with a coaxial extension of the capillary 3.

(2) Regarding Ionization Step (Electric Charging Step)

An explanation is given to the "ionization step (electric charging step)" in the manufacturing method of a particle-dispersed film as an embodiment of the present invention. It is necessary that the particles in the solution used as the source material are fragmented and ionized (electrically charged) from the solution at least before being introduced into the separation device. Specifically, in a period until reaching the deposited body, the "source material" is electrically charged/fragmented, and is possibly made in various states. The droplet released from the capillary tip part 3a as a solution supply device is ionized by the voltage applied to the capillary 3, and is released toward the jet nozzle 4a as a charged droplet. Note that, preferably, the capillary tip part 3a is disposed substantially under, the atmospheric pressure. This is because, in the case of the atmospheric pressure, it is possible to obtain an effect (effect as the solvent removing step) that a solvent component in the charged droplet released from the capillary tip part is evaporated before reaching the jet nozzle 4a. Moreover, as the solvent removing step, it is also possible to employ a method of increasing a flying range of the charged droplet under the atmospheric pressure by increasing a distance between the capillary tip part 3a and the jet nozzle 4a. Moreover, as the solvent removing step, it is also possible to employ a method of introducing heating gas into the capillary tip part. In this case, the method may be a method of simply turning a periphery of the capillary to a heating gas atmosphere. Alternatively, the method may be a method of providing a heating gas line coaxial with the capillary on the periphery of the capillary, or may be a method of providing a heater on the periphery of the capillary. Moreover, as the solvent removing step, it is also possible to employ a method of introducing nebulizer gas into the capillary tip part. In this case, the method may be a method of simply introducing the nebulizer gas to the vicinity of the capillary tip part, or may be a method of providing a nebulizer gas line coaxial with the capillary, on the periphery of the capillary. Moreover, as the ionization step and the solvent removing step, a high-frequency ultrasonic wave may be further applied to the capillary tip part. In such a way, an effect of assisting the formation of the fine liquid droplet and an effect of promoting the evaporation of the solvent can be obtained. Note that by controlling the kind of the solution, a condition for applying voltage to the capillary, and an atmosphere of the tip part of the capillary, etc, the effect of the side chain removing step can also be provided in the ionization step. Alternatively, in a region where the "source material" forms a so-called plume in the flying range from the capillary to the jet nozzle, an electrode for discharging or an antenna is provided, and a high voltage is applied to cause the electric discharge. Whereby, it is also possible to electrically charge the flying "source material". At this time, it is possible to apply a direct current, an alternating current, or a high frequency to the electrode for discharging or the antenna, and an efficient electric charging process is provided, through an electron-impact to the flying "source material" by arc discharge, etc; a charged particle-impact by glow discharge, plasma generation, corona discharge, etc; an Auger process by an interaction with radicals; an electrolytic dissociation process by the electron-impact and an ultraviolet ray, etc. Note that it is also possible to provide the charging device not in the solution supply device as will be described later but in the vacuum chamber (FIG. 10). In this case, a process in which the source material passes through the vacuum chamber corresponds to the electric charging process. Of course, the electric charging process may be used in combination with the voltage application to the capillary. By using them in combination, preferably the fragmentation is further promoted.

(3) Regarding Side Chain Removing Step

An explanation will be given to the "side chain removing step" in the manufacturing method of a particle-dispersed film as an embodiment of the present invention. The charged droplet formed by the ionization step is introduced into the vacuum chamber 4 from the jet nozzle 4a, and is then introduced into the deposition chamber 5 from the skimmer nozzle 5a. As described above, the voltage applying means 4c and 5c are provided in the jet nozzle 4a and the skimmer nozzle 5a, respectively. In the present invention, it is found that by applying the voltage so as to satisfy "the jet nozzle>the skimmer nozzle", a rapid acceleration of the charged droplet released from the capillary tip part 3a is realized, and by this rapid acceleration, a kinetic energy (preferably 1 to 10 eV) is applied to the charged droplet, whereby the charged droplet rushes toward the above-described coaxial deposited substrate, at a high speed. Moreover, in the present invention, it is found that the effect of the rapid acceleration of the charged droplets can be obtained by setting the vacuum state so as to satisfy "capillary<vacuum chamber". This is because the rapid acceleration of the charged droplets occurs by applying a high voltage, when the charged droplets are set in a high vacuum state.

In this way, bonding of the particles and the side chains (coordinates) can be cut by collision energy between the charged droplet thus rapidly accelerated and the surface of the deposited substrate. Also, the side chains can be completely removed on the surface of the substrate. This method eliminates high temperature processing, and therefore is significantly effective in the point that the side chains can be removed without breaking the characteristics of the particles as the quantum dots.

In addition, by heating the surface of the deposited substrate 8 (to approximately 100° C. to 250° C.) in advance, sublimation of the residue (side chains) generated on the surface of the substrate is promoted, and the side chains can be further efficiently removed. However, the substrate must be heated at a temperature not breaking the emission characteristics of the quantum dots.

(4) Regarding Solvent Removing Step

The molecular mass of the solvent is extremely smaller as compared with the molecular masses of the particles and the side chains. By utilizing this fact, the component attributable to the solvent, which is not removed in the solvent removing step described in (2), further passes through the vacuum chamber, and reaches the surface of the deposited substrate of the deposition chamber, can be removed by the magnetic field generating means 7 as the separation device disposed in front of the deposited substrate. Specifically, since the molecular mass of the ionized solvent molecule ions is extremely smaller as compared with those of the other molecule ions, the ionized solvent molecule ions are affected by the magnetic field generated by the magnetic field generating means 7, its traveling trajectory is deflected, and can not reach the surface of the deposited substrate 8. By this step, the solvent can be removed.

ADVANTAGE OF THE INVENTION

According to the present invention, the particle dispersed film, with particles uniformly dispersed therein, and the particle deposit with particles deposited on the substrate can be manufactured, without complicating a manufacturing step and the manufacturing apparatus and with a simple structure. Moreover, the method of the present invention is excellent in removal performance of the impurities such as a carbon compound, phosphorus, and nitrogen, which are derived from the source material, thus realizing a contamination-free state. Furthermore, the obvious crystal interface does not exist between the obtained particles, thus making it possible to manufacture a particle-dispersed film with a low density of defects which is a carrier scattering factor and causes a non-radiation deactivation center or an extinction center. Furthermore, according to the method of the present invention, inter-diffusion between different kinds of materials does not occur. Accordingly, discontinuity of band-edge energy between the narrow-gap semiconductor and the wide-gap semiconductor for forming a three-dimensional potential well, being a base of a quantum dot structure of three-dimensional quantum well can be easily ensured. Therefore, by using the narrow-gap semiconductor particles becoming the (quantum dots) quantum wells or the wide-gap semiconductor particles becoming matrix as the particles, the quantum dot-dispersed light-emitting layer having excellent carrier transport ability and high light emission efficiency can be manufactured.

BEST MODE FOR CARRYING OUT THE INVENTION

Preferred embodiments of the present invention will be explained with reference to the drawings. However, in the following description, only examples of the present invention is given, and a technical scope of the present invention is not limited by the following description.

FIG. 1 is a cross-sectional view of a light-emitting diode having a particle-dispersed film according to an embodiment of the present invention. The light-emitting diode shown in FIG. 1 is composed of: a glass substrate 10; a hole-injection electrode layer 12 (material: p-type (N-doped or Cu-doped) ZnSe film; film thickness: 100 to 10000 nm; a light-emitting layer 14 (main materials: ZnSe, ZnS, ZnSSe, etc; film thickness: 1.5 to 1000 nm); an electron injection electrode layer 18 (materials: ZnS, ZnO, ZnSe, etc; film thickness: 100 to 10000 nm); a metal electrode (materials: Au, Pt, Cr, Al, In, Ga, etc, an alloy thereof or a laminated film thereof; film thickness: 20 to 100 nm); and a passivation film (serving as a protection film, not shown).

A manufacturing method of the light-emitting diode shown in FIG. 1 will be explained. First, on the glass substrate 10, by an MBE method, ITO (thickness: 100 to 500 nm) was formed as a transparent electrode, and a ZnSe: Cl film (indicating a film, with Cl doped in ZnSe. The same thing can be said hereafter) was formed as the electron injection electrode layer 12, specifically under conditions of setting fluxes at 2 to $4\times10^{-7}$ Torr for Zn and 5 to $8\times10^{-7}$ Torr for Se, a rate at 0.5 to 2 μm/hr, a substrate temperature at 230° C. or less, and with materials of ZnCl: powder and Al: pellets.

Next, on the electron injection electrode layer 12, a ZnSe film with a thickness of 1.5 to 1000 nm (here, 5 nm, 10 nm and 5 nm of ZnSe films were laminated to obtain 20 nm in total)

was formed as the light-emitting layer 14 by the MBE method, specifically under the conditions of fluxes (Zn: 2 to $4\times10^{-7}$ Torr Se: 5 to $8\times10^{-7}$ Torr), a rate (0.5 to 2 μm/hr); a substrate temperature (150 to 300° C., however, light emitting characteristics of the quantum dots should not be broken at this temperature), and a background pressure ($1\times10^{-8}$ Torr or more and $1\times10^{-7}$ Torr or less). Here, at a point of time when the light-emitting layer 14 with a defined film thickness (approximately 5 m) was formed while the light-emitting layer 14 was being formed, the supply of the ZnSe material was stopped, and introduction of materials of quantum dots 16 and a matrix layer 14' (to be described later) was started, and a quantum dot-dispersed light-emitting layer 14a (film thickness: approximately 10 nm) was formed. A description will be made later in detail of the formation of the quantum dot-dispersed light-emitting layer 14a. After the quantum dot-dispersed light-emitting layer 14a with the defined film thickness was formed, the supply of the materials of the quantum dots 16 and the matrix layer 14' (described later) was ended, and the formation of the light-emitting layer 14 (film thickness: about 5 nm) was performed again.

Next, on the light-emitting layer 14, a ZnSe: Cu (indicating a film in which Cu is doped into ZnSe. The same thing can be said hereafter) film with a thickness of 100 to 10000 nm (here, 300 nm) was formed as the hole-injection electrode layer 18 by the MBE method, specifically under the conditions of fluxes (Zn: 1 to $2\times10^{-7}$ Torr, Se: $1\times10^{-6}$ Torr, Cu: a desired temperature (about $1\times10^{-8}$ Torr), a rate (0.5 to 2 μm/hr), a substrate temperature (about 240° C.), and materials (6N for all Zn, Se and Cu), and a background pressure ($1\times10^{-11}$ Torr or more and $5\times10^{-9}$ Torr or less). Moreover, as shown in FIG. 1, as the metal electrode, 30 nm of Au was formed, to thereby form the light-emitting diode of the present invention.

Light-emitting characteristics of the obtained light-emitting diode are shown in FIG. 6. An emission color from the quantum dots substantially dominates the light emission, and light emission with a single wavelength (535 nm) was observed. Energy efficiency was 1%, and luminance was 200 cd/m$^2$.

Next, a formation method of the quantum dot-dispersed light-emitting layer 14a will be explained in detail.

(1) Used Apparatus

The formation of the quantum dot-dispersed light-emitting layer 14a was performed by using an apparatus shown in FIG. 4. First, here, a solution supply rate by a syringe pump was set at 3.3 μl/min. Note that micrometers (not shown) are attached onto a capillary 3 in X, Y and Z-directions, thus making it possible to finely adjust a position of a capillary tip part 3a. The capillary tip part 3a is disposed at a distance of 0 to 50 mm from a jet nozzle 4a. Note that a space between the capillary tip part 3a and the jet nozzle 4a is substantially set in the atmospheric pressure. Note that, here, an inner diameter of the capillary tip part 3a is 20 μm.

Moreover, a pressure in a vacuum chamber 4 was set at 1 Torr, and a pressure in a deposition chamber 5 was set at $1\times10^{-6}$ Torr or less. The jet nozzle 4a and the skimmer nozzle 5a are arranged coaxially with each other. A distance between the jet nozzle 4a and the skimmer nozzle was set in a range from 1 to 10 mm. Note that a position of the capillary tip part 3a described above is adjusted so as to coincide with the center positions of the jet nozzle 4a and the skimmer nozzle 5a. Moreover, although not shown, substrate holding means 8a is provided with heating means, thus making it possible to heat a deposited substrate 8. Here, a temperature of the substrate was set at 230° C. When such a substrate temperature is too high, crystals of the quantum dots are amorphized, a breakage of a quantum well structure occurs, caused by inter-diffusion between quantum wells and the matrix, the light-emitting characteristics are thereby degraded, and this is not preferable. Meanwhile, when the substrate temperature is excessively low, components attributable to a solvent and side chains are easily remained when particles, etc, collide with the substrate, and this is not preferable.

Magnetic field generating means 7 has a function (mass-separating function) to remove components with small molecular weights (such as solvent molecule ions and side-chain molecule ions) before the particles, etc, released from the capillary tip part reach the deposited substrate.

(2) Preparation of Solution

As a source material, a solution, with particles having hydrocarbon side chains coordinated therein dispersed in an organic solvent, was used for both of the quantum dots and the matrix (light-emitting layer). Specifically, nanocrystals, having a structure as shown in FIG. 5 (hydrocarbon (containing N, P, etc) compounds with a diameter of 1.5 to 7.0 nm and side chains of approximately C5 to C30) were used for both of the quantum dots and the light-emitting layer. The material of the quantum dots has a core-shell structure, wherein a core portion is formed of CdSe, and a shell portion is formed of ZnSe. ZnSe—content substance was used for the material of the light-emitting layer. A solution, with these nanocrystals dispersed in a mixed solution of toluene and acetone was used.

In addition, a solution, with a concentration of the quantum dots set at 0.01 to 0.5 mg/ml, and a volume ratio of CdSe and ZnSe set at 5:95, was used. The volume ratio in the solution is determined from a volume ratio of the quantum dots to be dispersed, and it is preferable to set the volume ratio of CdSe at 100 ppm to 30% from the point of ensuring a sufficient potential barrier width of the quantum well, and eventually, in the point of forming quantized levels of electrons and holes.

(3) Formation of Particle-Dispersed Film

First, it was confirmed that aperture portions of the jet nozzle 4a and the skimmer nozzle 5a were not clogged, and it was confirmed that the above-described jet nozzle and skimmer nozzle are arranged coaxially with each other. The capillary 3 and the skimmer nozzle 5a were grounded, and a power supply for accelerating ions was connected to the jet nozzle 4a. Here, while an applied voltage is selected from 100V to 10 kV (preferably, 200 to 350V), the applied voltage was set at 330V here.

Moreover, ion beams were collimated by using a field-type ion lens 6. Here, an einzel lens was used as the field-type ion lens 6. Here, the field-type ion lens 6 was composed of three cylindrical electrodes 6a, 6b and 6c which have the same diameter, and the respective cylindrical electrodes are located in an array structure where they are coaxial with one another. By controlling voltages to be applied to the three field-type ion lenses, the three field-type ion lenses play a role of collimating electrodes of the ion beams. The voltages to be applied are determined appropriately depending on a type (size, molecular weight, and the like) of the particles. As a matter of course, the field-type ion lens 6 functions to collimate the particles. However, in addition, the field-type ion lens 6 also effectively functions to collimate lightweight ions such as ions of solvent molecules, thus making it possible to efficiently remove the lightweight ions in a subsequent step (for example, by magnetic field generating means and the like). Here, −6 kV was applied to the field-type ion lens 6a on the skimmer side, and −1 kV was applied to the intermediate field-type ion lens 6b. Note that an electric potential of the skimmer nozzle 5a was set at an equal electric potential to that of the jet nozzle 4a or less.

A droplet was formed on the capillary tip part 3a by a microsyringe 2, and in this state, a voltage was applied to the capillary tip part 3*a* to generate a charged droplet by ionization of the droplet. Then, the charged droplet was released from the capillary tip part to the jet nozzle 4*a*. At this time, the voltage was set at 1.9 kV. Moreover, it was confirmed by a pA meter that an ion current density value indicated by a Faraday cup was 0.15 nA/cm$^2$.

According to the manufacturing apparatus of this embodiment, the charged droplet released in the atmosphere entered the vacuum chamber 4 from the jet nozzle 4*a*, then entered the deposition chamber 5 from the skimmer nozzle 5*a*, and reached a deposited substrate surface 8. The apparatus of the present invention makes it possible for the charged droplet to remove the components attributable to the solvent and the side chains until the charged droplet collides with the surface of the deposited substrate 8. Moreover, the apparatus of the present invention makes it possible for the charged droplet to promote acceleration of a traveling speed thereof when the charged droplet passes through the jet nozzle 3*a* and the skimmer nozzle 4*a* after being released from the capillary tip part 3*a*. As a result, when the charged droplet collides with the surface of the substrate 8, it is possible to desorb, by the collision, the components attributable to the solvent and the side chains, and it is possible for only the particles to remain on the surface of the substrate.

Here, the light-emitting layer 14 of the present invention is classified into the following two modes in terms of a structure (see FIG. 2 and FIG. 3).

(I) Embodiment in which Quantum Dots are Dispersed in a Part of Light-Emitting Layer (FIG. 2)

As shown in FIG. 2, in a part of the light-emitting layer 14 in a film thickness direction, the quantum dots 16 (material: CdSe, CdSe/ZnS (meaning CdSe with a shell formed of ZnS. The same thing can be said hereinafter), etc; diameter: 15 to 60 Å)) are dispersed in the matrix material 14'. The light-emitting layer 14*a* (film thickness: 1.5 to 1000 nm) of such a dispersed portion corresponds to the particle-dispersed film as an aspect of the present invention.

This embodiment has a sandwich structure in which the light-emitting layer 14*a* of a dispersing portion is sandwiched between materials (here, ZnSe) of the light-emitting layer. Electrons and carriers injected from the respective electrode layers transfer in the material of the light-emitting layer, are associated with each other in the quantum dots 16 in the light-emitting layer 14*a* of the dispersing portion, and emit light. Accordingly, it is necessary that the transition of the carriers from the materials of the light-emitting layer to the material of the matrix be performed smoothly. From this point, it is preferable that both layers be formed of the same material or materials having the same crystal structure (such as ZnSe and ZnS).

The light-emitting layer of this embodiment is preferable from a viewpoint that a flat morphology can be obtained. This is because a light-emitting layer capable of generating a uniform strength of a light emitting surface can be thus obtained.

As a manufacturing method for carrying out this embodiment, the following method is given as an example.

(I)-1

A method wherein while supplying the quantum dot material in a process including "an ionization step, a solvent removing step, and a side chain removing step", the matrix material is supplied from another channel (using the MBE method, an IBD method, and the like).

From a viewpoint of smoothening the transition of the carriers from the light-emitting layer material to the matrix material, it is preferable to supply the matrix material by a method similar to that of the light-emitting layer material. This is because continuity of crystalline properties is thereby easily realized.

From a viewpoint of macro-morphology, this method is preferable. This is because a densely filled voidless film is thereby easily realized.

(I)-2

A method wherein while supplying the quantum dot material in the process including "the ionization step, the solvent removing step, and the side chain removing step", the matrix material is also similarly supplied in the process including "the ionization step, the solvent removing step, and the side chain removing step".

In this case, in a similar way to the quantum dot material, "the solution, with particles having the hydrocarbon side chains coordinated therein dispersed in the organic solvent" can be used for the matrix material. Here, a solution, with both of the quantum dot material and the matrix material dispersed therein may be used, or the solution, with the quantum dot material and the matrix material separately dispersed therein may be used. The method of using the solution, with both of them dispersed in the same solution, is free of complicated apparatus, and is preferable in the point that a light-emitting layer 14*a* of a dispersing portion of a uniform composition can be formed, by blending the matrix material and the quantum dot material at a prescribed ratio in advance.

This method is preferable from a viewpoint of a reduction of interdiffusion between different kinds of the materials. This is because discontinuity of band-edge energy between a narrow-gap semiconductor and a wide-gap semiconductor can be ensured easily.

(I)-3

A method of simultaneously adopting the above-described both methods.

This method is preferable from a viewpoint of merits of both of the above-described methods. This is because a quantum well structure without any defect can be easily realized.

(II) Embodiment, with Quantum Dots Dispersed in an Entire Body of the Light-Emitting Layer (FIG. 3)

As shown in FIG. 3, in the entire body of the light-emitting layer 14, the quantum dots 16 (material: CdSe, CdSe/ZnS, etc; diameter: 15 to 60 Å) are dispersed in the material of the light-emitting layer. The entire body of the light-emitting layer 14 (film thickness: 1.5 to 100 nm) corresponds to the particle-dispersed film of the present invention. In this embodiment, the electron and the carrier injected from each electrode layer transfer in the materials of the light-emitting layer, are associated with each other in the quantum dots 16, and emit the light.

The light-emitting layer of this embodiment is preferable from a viewpoint of a probability of carrier recombination. This is because a light-emitting layer with high light emission efficiency can be thereby obtained.

As a manufacturing method for carrying out this embodiment, the following method is given as an example.

(II)-1

A method wherein while supplying the quantum dot material in the process including "the ionization step, the solvent removing step, and the side chain removing step", the material of the light-emitting layer is supplied from another channel (using the MBE method, the IBD method, and the like).

From a viewpoint of the macro-morphology, this method is preferable. This is because the densely filled voidless film can thereby be easily realized.

(II)-2

A method wherein while supplying the quantum dot material in the process including "the ionization step, the solvent removing step, and the side chain removing step", the material of the light-emitting layer is also similarly supplied in the process including "the ionization step, the solvent removing step, and the side chain removing step".

In this case, in a similar way to the quantum dot material, "the solution, with particles having the hydrocarbon side chains coordinated therein dispersed in the organic solvent" can be used for the matrix material. Here, a solution, with both of the quantum dot material and the matrix material dispersed therein may be used, or the solution, with the quantum dot material and the matrix material separately dispersed therein may be used. The method of using the solution, with both of them dispersed in the same solution, is free of complicated apparatus, and is preferable in the point that a light-emitting layer 14a of a dispersing portion of a uniform composition can be formed, by blending the matrix material and the quantum dot material at a prescribed ratio in advance.

This method is preferable from a viewpoint of the reduction of the interdiffusion between different kinds of the materials. This is because the discontinuity of the band-edge energy between the narrow-gap semiconductor and the wide-gap semiconductor can be ensured easily.

(II)-3

A method simultaneously adopting both of the above-described methods.

This method is preferable from a viewpoint of merits of both of the above-described methods. This is because the quantum well structure without any defect can thereby easily realized.

EXAMPLES

Example 1

Explanation will be given to a case of manufacturing the light-emitting diode (FIG. 1) by using the manufacturing method shown in (I)-1, as an example 1. FIG. 7 is a view showing an outline of an apparatus used in Example 1.

The apparatus shown in FIG. 7 is an apparatus in which an ultrahigh-vacuum deposition chamber 9 is connected to the particle deposition apparatus shown in FIG. 4 through a load lock chamber 9a. Inside of the ultrahigh-vacuum deposition chamber 9 can be turned into an ultrahigh vacuum state by a ultrahigh-vacuum pump 9d, and a deposition source material evaporated from an evaporation source 9b set inside is deposited on the deposited substrate 8 held by a substrate holding means 9a. In addition, the evaporation source 9b is also set inside the deposition chamber 5 of the particle deposition apparatus as shown in FIG. 4, and according to needs, the evaporated source material is deposited on the substrate 8, as well as depositing the particles thereon. Accordingly, the processing of depositing the particles is performed as needed in such a way that the substrate 8 on which the particles are deposited in the deposition chamber 5 is transferred to the ultrahigh-vacuum deposition chamber 9 though the load lock chamber 9a, necessary deposition is performed, and the substrate 8 on which the deposition is performed in the ultrahigh-vacuum chamber 9 is reversely transferred to the deposition chamber 5.

As the substrate 8, a glass substrate coated with ITO was used. The glass substrate coated with an ITO film was subjected to ultrasonic cleaning by pure water, acetone, and pure water, and then was subjected to oxidation etching. Subsequently, the glass substrate was rinsed by pure water, was dried by nitrogen blow, and was set on the substrate holding means 8a.

In the deposition chamber 5, as the evaporation source 9b, Zn and Se becoming source materials of the matrix material were charged and installed into each Knudsen cells (hereinafter referred to as K cells). Although not shown, a shutter for shutting beams is individually fitted to each K cell. In the particle deposition apparatus, axes of molecular beams and ion beams are individually directed to a center axis of the substrate 8 fitted in a facedown orientation in the deposition chamber 5. Moreover, although not shown, between the respective beams and the substrate 8, a main shutter for shutting all the beams is installed in the vicinity of the substrate 8. During the deposition, the substrate is heated and rotated.

Before forming the light-emitting layer 14 in FIG. 2, the electron injection electrode layer 12 was prepared in the ultrahigh-vacuum deposition chamber 9. This is because arrival vacuum can be made higher in the ultrahigh-vacuum deposition chamber 9 than in the deposition chamber 5.

As the electron injection electrode layer 12, a ZnSe: Cl (indicating a film, with Cl doped in ZnSe. The same thing can be said hereafter) film was formed by the MBE method, specifically under conditions of fluxes (Zn: 2 to $4\times10^{-7}$ Torr and Se: 5 to $8\times10^{-7}$ Torr), a rate (0.5 to 2 μm/hr), a substrate temperature (230° C. or less), and a material (ZnCl: powder, Al: pellet).

Further, a ZnSe film was formed as a part of the light-emitting layer 14 (1.5 to 100 nm) in the ultrahigh-vacuum deposition chamber 9, specifically under the conditions of fluxes (Zn: 2 to $4\times10^{-7}$ Torr Se: 5 to $8\times10^{-7}$ Torr, a rate (0.5 to 2 μm/hr), a substrate temperature (150 to 300° C.), and a background pressure ($1\times10^{-10}$ Torr or more and $1\times10^{-7}$ Torr or less). Here, at a time point of forming a part of the light-emitting layer 14 with a defined film thickness (about 5 nm), the supply of the ZnSe material was stopped, and the substrate was traveled into the deposition chamber 5 through the load lock chamber 9a.

In the deposition chamber 5, the condition of the ionization step was arranged in the same way as described above, beam intensity (density) is confirmed by a Faraday cup using ion current, and thereafter each beam of quantum dots, Zn and Se was released, and finally, by aperture the main shutter in front of the substrate not shown, the quantum dot-dispersed light-emitting film 14a was formed into a thickness of 10 to 100 nm, specifically under the conditions of a quantum dot dispersion (0.5 mg/mL), flux (Zn: 0.5 to $1\times10^{-7}$ Torr Se: 1 to $3\times10^{-7}$ Torr, an ion current: 1.5 nA), a rate (0.1 to 0.6 μm/hr), a substrate temperature (150 to 300° C.), and a background pressure ($1\times10^{-8}$ Torr or more to $1\times10^{-7}$ Torr or less). Here, at a time point of forming the quantum dot-dispersed light-emitting layer 14a with a defined thickness (approximately 5 nm), the main shutter (not shown) was closed, and the supply of the ZnSe material was stopped.

The substrate 8 was transferred again to the ultrahigh-vacuum deposition chamber 9 through the load lock chamber 9a, and a part of the light-emitting layer 14 and the hole-injection electrode layer 18 were prepared.

A ZnSe film with a thickness of approximately 5 nm was formed as a part of the light-emitting layer 14, specifically under the conditions of flux (Zn: 2 to $4\times10^{-7}$ Torr Se: 5 to $8\times10^{-7}$ Torr), a rate was (0.5 to 2 μm/hr), a substrate temperature (150 to 280° C.) however, the light-emitting characteristics of the quantum dots should not be broken at this temperature), and a background pressure ($1\times10^{-10}$ Torr or more to $1\times10^{-9}$ Torr or less).

Further, as the hole-injection electrode layer 18, a ZnSe: Cu (indicating a film, with Cu doped in ZnSe. The same thing can be said hereafter) film with a thickness of 100 to 10000 nm (here, 300 nm) was formed by the MBE method, specifically under the conditions of flux (Zn: 1 to 2×10$^{-7}$ Torr Se: 1×10$^{-6}$ Torr, Cu: a desired temperature (about 1×10$^{-8}$ Torr) a rate (0.5 to 2 μm/hr), a substrate temperature (about 240° C.), and materials (6N for all Zn, Se and Cu), and a background pressure (1×10$^{-11}$ Torr or more and 5×10$^{-9}$ Torr or less).

Thereafter, as the metal electrode, Au was formed into a thickness of 20 to 100 nm, and thus the light-emitting diode of the present invention was formed.

A cross section of the obtained light-emitting diode was observed by a transmission electron microscope (TEM). As a result, the film other than a quantum dot-dispersed portion is in an appearance of a columnar polycrystal oriented to a c-axis. No obvious crystal interface was observed in the quantum dot-dispersed portion, but something like a polycrystalline structure composed of microcrystallites was confirmed in the quantum dots dispersed portion, wherein the film, with the quantum dots uniformly dispersed in the matrix, was formed. Note that an average distance between centers of the quantum dots was about double the diameter of the quantum dots.

When a voltage was applied to the obtained light-emitting diode in a perpendicular direction, the same light emitting characteristics as shown in FIG. 6 is exhibited.

In addition, when the deposition before the quantum dot-dispersed film was totally epitaxially grown and the light-emitting diode was prepared by using a ZnSe monocrystalline substrate instead of the glass substrate of this embodiment, it was confirmed that the efficiency and luminance were further improved than a case of the glass substrate. However, when an expanded area is taken into consideration, the monocrystalline substrate is not suitable to use, and the glass substrate of this embodiment would be suitable in practical application.

Example 2

Hereunder, explanation will be given to an example of depositing the quantum dots in the case of manufacturing the light-emitting diode (FIG. 1) by using the manufacturing method shown in (I) described above, as Example 2. In this example, a quantum-dot deposited layer in a light-emitting diode with a sandwich structure was manufactured, in which the quantum dots are not dispersed in the matrix materials, and a quantum dot-deposited layer with a thickness of several nanometers is provided, and the aforementioned quantum-dot deposited layer was sandwiched between the matrix materials. FIG. 8 is a view showing an outline of a particle deposition apparatus used in Example 2. Moreover, as a deposited substrate, there was used a substrate in which the ZnSe light-emitting layer with a thickness of 10 nm is formed on a substrate (glass substrate coated with ITO film) similar to that in Example 1.

In this example, the capillary with the syringe pump was used as a solution supply device. In FIG. 8, a microsyringe pump 2 extrudes a particle-dispersed solution 1 in a cylindrical body portion 2b by a piston 2a, sends the particle-dispersed solution 1 to a capillary 3 through a tube 2c, and emits the particle-dispersed solution 1 from a capillary tip part 3a. Note that a defined voltage can be applied to the capillary 3 by voltage applying means 3b. Moreover, a solution supply rate by the microsyringe pump 2 is 0.5 to 4 μl/min (preferably, 1 to 2 μl/min). Furthermore, although not shown, micrometers are attached to the capillary 3 in the X, Y and Z-directions, thus making it possible to finely adjust a position of the capillary tip part 3a. Note that, although such a structure as described above was used for the capillary, the capillary is defined, in the present invention, as a solution delivery instrument that exposes a surface of the above-described solution by a capillary phenomenon or a wetting phenomenon. A particle dispersion emitted from the capillary tip part 3a is introduced into a vacuum chamber 4 through a jet nozzle 4a provided on an upstream tip part in the vacuum chamber 4, and further, is introduced into a deposition chamber 5 through a skimmer nozzle 5a provided on an upstream tip part in a deposition chamber 5. A distance between the capillary tip part 3a and the jet nozzle 4a is set at 0 to 50 mm, preferably, 4 to 10 mm. In this example, the distance is set at 8 mm. Note that a space between the capillary tip part and the jet nozzle is substantially set at the atmospheric pressure. Moreover, the capillary 3 with an inner diameter of the capillary tip part 3a set at 20 μm was used. The jet nozzle 4a and the skimmer nozzle 5a are arranged coaxially with each other. A distance between the jet nozzle 4a and the skimmer nozzle 5a was set appropriately in a range from 1 to 10 mm (in this example, was set at 3 mm). Note that it is made possible to individually apply defined voltages can be applied to the jet nozzle 4a and the skimmer nozzle 5a by voltage applying means 4c and 5c.

The deposition chamber 5 is composed of an ion optics region 51 and a high vacuum region 52. The ion optics region 51 and the high vacuum region 52 are partitioned from each other by a partition wall 5e having an aperture portion 5b, and reference axes (center axes in directions where the particles travel) of both of the regions are made perpendicular to each other. The particles are made to be transitable through the aperture portion 5b. In this example, a diameter of the aperture portion 5b was set at 20 mm. The vacuum chamber 4, the ion optics region 51, and the high vacuum region 52 are evacuated by a vacuum pump not shown through evacuation ports 4d, 51d and 52d, respectively so as to maintain an appropriate vacuum state. For such evacuation, for example, differential evacuating means is used, and thus the pressure has a relation of "the capillary tip part (atmospheric pressure)>vacuum chamber>ion optics region>high vacuum region". Here, the pressure in the vacuum chamber was set at 1 Torr, the pressure in the ion optics region was set at 1×10$^{-5}$ Torr, and the pressure in the high vacuum region was set at 1×10$^{-6}$ Torr. Here, the differential evacuation is performed in the following manner. Specifically, a region from the jet nozzle 4a (φ0.5 mm) to the skimmer nozzle 5a (φ0.7 mm) is evacuated by a mechanical booster pump or a rotary pump with an evacuation rate of approximately 100 to 500 [m$^3$/h], and is maintained in a vacuum state of approximately 1 [Torr]. Moreover, the ion optics region 51 located at a subsequent stage is evacuated by a turbo molecular pump or the like with an evacuation rate of 300 to 1000 [L/s], and is thereby maintained in a vacuum state of approximately 10$^{-4}$ [Torr]. Furthermore, an orifice with a diameter of approximately 20 mm and a thickness of several millimeters is provided between the ion optics region 51 and the high vacuum region 52 (region for the deposition), and the high vacuum region is evacuated by a turbo molecular pump with an evacuation rate of approximately 1000 to 2000 [L/s], and the region is thereby maintained in a high-vacuum state of approximately 10$^{-6}$ [Torr].

In the ion optics region 51, a field-type ion lens 6 as lens devices and an energy separation device 71 as a separation device are provided on a coaxial extension of the jet nozzle 4a and the skimmer nozzle 5a. The field-type ion lens 6 is an einzel lens composed of three cylindrical electrodes 6a, 6b and 6c. The voltage can be applied to the cylindrical electrodes 6a and 6b by voltage applying means 6d and 6e. The cylindrical electrode 6c is set at a ground potential. The field-type ion lens 6 has a function of collimating the ion beams. Here, the field-type ion lens 6 functions if one or more cylindrical electrodes are provided. However, as in this example, it is preferable that the field-type ion lens 6 are composed of the three cylindrical electrodes 6a, 6b and 6c having the same diameter, and that the respective cylindrical electrodes are set in a coaxial arrangement, respectively. By controlling the voltage applied to the three field-type ion lenses, the three field-type ion lenses serves as collimating electrodes of the ion beams. The voltage to be applied is determined appropriately depending on the type (size, molecular weight, etc) of the particles. As a matter of course, it is also effective when a lightweight ion such as a solvent molecule ion is collimated, to allow it to be efficiently removed in the later step (for example, by magnetic field generating means and energy selecting means).

Moreover, in this example, the energy separation device 71 is used as the separation device. The energy separation device 71 includes a first electrode plate 71a set at the ground potential, and a second electrode plate 71b disposed parallel to the first electrode plate 71a at a defined distance. In the first electrode plate 71a, an incoming hole 71c and an out-going hole 71d are provided. The incoming hole 71c is located on the coaxial extension of the above-described jet nozzle 4a and skimmer nozzle 5a. Moreover, the second electrode plate 71b is set at a defined electric potential by voltage applying means 71e. The energy separation device 71 bends the ion beams incident onto the incoming hole 71c at a defined angle, classifies particles having desired energy and allows it to be emitted from the out-going hole 71d. As the bending angle, 90 degrees are preferable since the highest resolving power can be obtained. The energy separation device 71 has a role (mass, energy separating function) to remove particle agglomerates incorporating a component of a small mass number (such as solvent molecule ion and side-chain molecule ion), flying particles and solvents, and organic molecules as a material of the side chains, before the particles and the like, which are emitted from the capillary tip part 3a, reach the deposited body substrate 8.

The energy separation device 71 is a selection mechanism that utilizes electrostatic deflection. When a certain amount of the electrostatic deflection is obtained, a deflection voltage is proportional to kinetic energy of charged particles. Therefore, it is possible to select the kinetic energy of the charged particles by the deflection voltage. As the device of FIG. 8, a device with a structure of parallel flat-plate electrodes is used. An electrode 71a, which is one of the electrodes, has two apertures, and one of them is the incoming hole 71c, and the other is the out-going hole 71d. To the electrode 71b that does not have the apertures, a voltage $\pm V_d$ ($+V_d$ when the charged particles are positive ions, $-V_d$ when the charged particles are negative ions) that decelerates the charged particles is applied. First, when the beams of the charged particles are made obliquely incident from the incoming hole, and the charged particles that have entered the electrode have a particular value (energy value) determined by the kinetic energy owned by the particles, the charged particles are repelled by the electrode and are emitted from the out-going hole. Here, the energy value is determined by the inter-electrode distance, the inter-aperture distance, and the voltage. Accordingly, by varying parameters, the energy value of the particles desired to be classified can be determined.

For example, it is possible to classify the particles with prescribed energy by bending the beam at 90 degrees under conditions of the inter-electrode distance set at 26.5 mm, the inter-aperture distance set at 53.0 mm, and the voltage set at 5 kV to 8 kV. Moreover, the ion current density obtained, when a value of the voltage $\pm V_d$ corresponding to a desired mass-charge ratio (mass of ion/charge amount) is given, is determined by the diameter of the capillary, the applied voltage to the capillary, the flow rate of the solution, viscosity of the solution, volatility, surface tension, polarity, pH (conductivity), properties of a solute, etc. Accordingly, by varying these parameters, a desired ion can be classified. The ion classified by the energy selecting means has a constant speed irrespective of the kind of ion, because the speed is dominant by a free jet flow. Thus, a desired mass-charge ratio (ion energy) can be selected. Moreover, although not shown, intensity (density) of the emission of desired charged particle beam from the out-going hole was confirmed by measuring ion current by the Faraday cup. In this example, the voltage applied to the capillary 3 by the voltage applying means 3b was set at 1.9 kV, the voltage E1 to the field-type ion lens 6a was set at −8 kV, the voltage E2 to the field-type ion lens 6b was set at 3 kV, and the voltage Vd applied to the electrode 71b by the voltage applying means 71e of the energy separation device 71 was set at 8 kV. Moreover, a method of dispersing only the particles on the substrate by an amount not satisfying one molecular layer was tried, without using the matrix materials of Zn and Se. Here, at a time point of forming the quantum dot-dispersed film 14a with a defined film thickness (about 5 nm), a main shutter (not shown) in front of the substrate was closed, and the supply of the ZnSe material was stopped.

Here, a function of the above-described energy separation device 71 will be briefly explained. The above-described capillary 3 and its counter electrode (here, the jet nozzle that can be applied with voltage) are capable of forming an electric field between the solution supply device and the vacuum chamber, and can be called a so-called electrospray device. Moreover, a fluid flow containing the ion, which is emitted from the electrospray, can form the free jet flow when being introduced into the jet nozzle 4a. Specifically, the ion species generated by the electrospray gets on the free get flow of gas and is introduced into the vacuum. At this time, (the free jet flow occurs in a viscous flow range satisfying $\lambda_0$ (mean free path) <D (hole diameter of the orifice)), a flow rate is generally determined when enthalpy owned by the gas before expansion is entirely converted into translational energy by a heat insulation process. The mean free path of the air (including diatomic molecules such as nitrogen and oxygen) is approximately $10^{-7}$ [m]. The air is introduced into the vacuum through the orifice with a diameter of several hundred micrometers, thus making it possible to form the free jet flow. At this time, the speed v [m/s] of the free jet flow is expressed by an arithmetic function of a distance x[m] from the orifice as follows:

$$v = \{3.65(x/D)^{2/5} - 0.82(x/D)^{-2/5}\}\{\gamma kT/m\},$$
$$T = T_0(P_0/P)^{(1-\gamma)/\gamma}$$

where:

D: diameter [m] of orifice ~ $5 \times 10^{-4}$ [m];

γ: specific heat ratio ~ 1.4;

T: temperature [K] of jet;

$T_0$: temperature [K] of gas to be introduced ~ $3 \times 10^2$ [K];

P: pressure [Pa] of low-pressure side of orifice ~ $1 \times 10^2$ [Pa]; and $P_0$: pressure [Pa] of high-pressure side of orifice ~ $1 \times 10^5$ [Pa], corresponding to about $10^3$ [m/s].

In the case of a mixture, the gas (air at this time), being a main component and the other mixture fly at substantially the same speed in the free jet flow. Therefore, a heavy component has extremely high kinetic energy (actually, the larger a differential pressure (pressing pressure) in the orifice is, the smaller a speed difference by the mass becomes, and a speed distribution of heavier molecule becomes sharpened extremely. Although a little amount of speed difference and temperature difference remains and there are a lot of heavy molecules on a center axis of the jet, these points can be ignored.). Meanwhile, field mobility η=v/E (E is electric field) of the particles (diameter is several nanometers) in the gas (viscosity coefficient is approximately $2\times10^{-5}$ [Pa·s]) is a value of about $\eta\sim10^{-5}$ [m²/s·V] when satisfying $P\sim1\times10^5$ [Pa], and is a value of about $\eta\sim10^2$ [m²/s·V] when satisfying $P\sim1\times10^2$ [Pa].

Therefore, terminal speed of the ion, which is determined owing to contributions of an electric field (about $10^6$ [V/m]) applied to the electrospray on the high-pressure side of the orifice and an electric field (about $10^4$ [V/m]) applied for glow discharge on the low-pressure side of the orifice, are approximately $10^1$ [m/s] and approximately $10^2$ [m/s], respectively. Moreover, in the ion optics region before the ions reach the energy selection mechanism, electrostatic potentials are the same between an initial state and a final state, and acceleration and deceleration of the ions caused by the electric field do not occur between them. Accordingly, the ion made incident on the energy selection mechanism has a device structure wherein almost the same speed is applied to the ion, irrespective of its kind. Of course, the energy selecting mechanism is not limited to this example, and it can be so constituted that an additional acceleration mechanism is inserted in a route of ion beam, and the energy added in this mechanism is taken into consideration.

In the energy selection mechanism, when the particles enter from the incoming hole and flies out from the out-going hole, the following expression is established:

$$L=2V_0/V_d \sin 2a$$

where:

L: distance between apertures provided in an electrode (26.5 mm at this time);

a: incident angle (45 degrees at this time);

$V_0$: acceleration voltage ($V_0=E_m/q$, $E_m$: kinetic energy, q: charge) for charged particles; and $V_d$: voltage for decelerating charged particles.

Since L and a are constant, $V_0$ can be analyzed by $V_d$.

Moreover, an expression: $V_0=(mv^2)/2$ $q=(m/q)\cdot(v^2/2)$ is established from:

$$V_0=E_{m/q;\ and}$$

$$E_m=(mv^2)/2.$$

As mentioned above, with regard to v, it is considered that all the ions have substantially the same speed in the free jet flow. Accordingly, the selection of the energy by this device means the selection of the mass-charge ratio m/q (mass/charge).

In the high vacuum region 52, there are provided a substrate holder 52g that holds the deposited substrate 8, a converging electrode 52b as a converging device that converges charged particle beams directed to the substrate 8, and a deceleration electrode 52c as a deceleration device that decelerates the charged particles beams thus converged and deposits the charged particle beams on the substrate 8. The outgoing hole 71d of the energy separation device 71, the aperture 5b of the partition wall 5a, the converging electrodes 52a and 52b, and the deceleration electrode 52c are individually provided on a coaxial extension. FIG. 9 is a view showing the substrate holder 52g, the converging electrode 52b, and the deceleration electrode 52c. As shown in FIG. 9, both of the converging electrode 52b and the deceleration electrode 52c are annular aperture electrodes. Aperture diameters of the converging electrodes 52a and 52b are 25.4 mm and 33 mm, respectively. Moreover, in the deceleration electrode 52c, an aperture portion with a substantially cone-trapezoidal shape is formed, and the substrate holder 52g is formed on a top of the cone-trapezoidal aperture portion. An aperture angle of the cone of the cone-trapezoidal shape is about 135 degrees.

The converging electrodes 52a and 52b have a function of preventing the beams from diverging by mutual Coulomb repulsions of positive (negative) ions when the ions are decelerated. In this example, the converging electrodes 52a and 52b are formed of the electrode 52a, being an aperture electrode applied with a negative (positive) voltage and being a ground electrode with outer diameter of about 120 mm and inner diameter of about 25 mm, and the electrode 52b with outer diameter of about 120 mm and inner diameter of about 33 mm. These electrodes are installed parallel to each other at an interval of 20 mm, thereby forming a parallel equipotential surface in the extreme vicinity of the substrate 8 together with the deceleration electrode 52c. A plate thickness of each of the electrodes was set at 2 mm. The structure of the apparatus of the present invention includes the deceleration device. This is a structure obtained and firstly found by the inventors of the present invention, after strenuously studying the structure of the present invention, wherein by using the solvent, with particles dispersed therein as source materials, only a target substance having a particular mass-charge ratio is obtained by the separation device. As a strenuous effort of the inventors of the present invention, it is found that in order to introduce the ion beams into the selection mechanism, the flying ions are desired to have large energy, while when the ions are deposited on the substrate with large energy, the ions sink deep into the substrate or bounce off the substrate, thus making it impossible for the particles to be adhered to the substrate. Namely, it is found that the energy of the particles as the deposit needs to be made large until just before the substrate, but the energy needs to be made small during depositing on the substrate. Therefore, the deceleration electrode 52c has a function of adjusting the kinetic energy of the flying positive (negative) ions to a value suitable for the deposition. The ion beams with energy as low as several electronvolts to several hundred electronvolts are prone to diverge by a spatial field effect, and accordingly, cannot travel in a long distance. Accordingly, the ion beams are desired to travel with high energy during long distance travel. However, the flying ions are not adhered to the substrate since the flying ions sink in and bounce off the substrate when the energy is excessively large. Therefore, it was found that the energy needs to be appropriately decelerated just before the substrate. Note that, in the apparatus of the present invention, it is possible to accelerate/separate/deposit, as ion clusters, even the flying ions with a cluster mass number of approximately $10^{10}$ amu, and a speed of the flying ions at this time is estimated to be about 500 to 5000 m/sec.

A positive (negative) voltage (such as 1 to 8 kV) is applied to the deceleration electrode 52c, thus forming the parallel equipotential surface on the substrate 8 and the vicinity thereof. Specifically, such a deceleration voltage that allows kinetic energy per atom contained in the ions to be 1 μeV to 1 eV is selected. In any case, the deceleration voltage is selected as a value that is sufficiently large for allowing the nanocrystalline ions to reach the substrate and to cause an inelastic deposition phenomenon and is sufficiently small for avoiding such heat generation that deforms and fixes the crystals in a process when the kinetic energy dissipates, which is owned by the ions while flying. In this example, the deceleration electrode 52c is installed at a distance of about 20 mm from the converging electrode 52b. The deceleration electrode has an outer diameter of about 120 mm, is provided with a taper (a bowl shape) of an about 135 degrees from the substrate holding portion with a diameter of about 33 mm to the vicinity of the outer diameter portion with a diameter of 90 mm, and thus cancels the spatial field effect, thus forming a vertical electric field on the deposited substrate, and thus making it possible to form a film with a high in-plane uniformity.

Note that, as described above, the deceleration device is necessary just before the deposited substrate in the present invention. However, when the particles are deposited on an insulated substrate, charges are generated on a surface of the substrate by deposition of a small amount of the particles, and accordingly, the particles are decelerated by the charges on the surface of the substrate. In this case, it is not necessary to provide the deceleration device in the apparatus itself (the surface of the deposited substrate serves as the "deceleration device" of the present invention).

A substrate holder 52g includes heating means, thus making it possible to heat the deposited substrate. Here, the substrate temperature was set at 100° C. When the substrate temperature is too high, the nanocrystals are turned into amorphous form, and the breakage of the quantum well structure itself occurs by the interdiffusion between the quantum well and the matrix. Thus, the nanocrystals do not function as the quantum dots, thereby deteriorating the light-emitting characteristics and this is not preferable. Note that, on principle, this apparatus can also extract the particles of a desired mass from a mixed solution in which plurality of kinds of particles are mixed. For example, by changing the voltage of the selecting means by using a single mixed solution, a film lamination of different kinds of particles can also be formed. Note that, as the particles handled here, ions ranging from extremely lightweight atomic ions ($1 \times 10^{-22}$ g) to heavy ions with a weight of approximately $1 \times 10^{-18}$ g are possible.

Preparation of Solution

In this example, as the source material of both of the quantum dots and the matrix (light-emitting layer), the solution, with particles having the hydrocarbon side chains coordinated therein dispersed in the organic solvent, was used as the source material. Specifically, for both of the quantum dots and the light-emitting layer, the nanocrystal having the structure as shown in FIG. 5 was used, such as (hydrocarbon (containing N, P, etc) compound with a diameter of 1.5 to 7.0 nm and side chains of about C5 to C30), and/or silicon compound (about Si5 to Si30) having a form in which carbon is replaced with silicon, and a weight of one particle is about $1 \times 10^{-20}$ g to $1 \times 10^{-17}$ g). The material of the quantum dots having the core-shell structure wherein the core portion is formed of CdSe, and the shell portion is formed of ZnSe, and the material wherein the core portion is formed of InP and the shell portion is formed of ZnSe, was used. A solution, with these nanocrystals dispersed in a mixed solution of toluene, diethyl ether, chloroform, and acetone (for example, chloroform: diethyl ether: toluene=6:3:1), was used.

Note that a concentration of the quantum dots is 0.01 to 0.5 mg/ml, and in addition, a mixed dispersion of CdSe, ZnSe, InP, ZnSe, InGaP, InGaAsP, ZnS, ZnSSe, GaN, siGe, C (diamond), etc, was used. For CdSe and ZnSe or InP and ZnSe, a solution with a volume ratio of 5:95 was used. The volume ratio in the solution is determined from the volume ratio of the quantum dots to be dispersed, and it is preferable to set the volume ratio of CdSe at 100 ppm to 30% from the point of ensuring the sufficient potential barrier width of the quantum well, and eventually, from the point of forming the quantized levels of the electrons and the holes. Moreover, according to the apparatus of this example, the solution, with particles dispersed, can be used as a supplying source material, and solubility is not required to be high in a state not allowing an aggregation to occur in the solution. The side chains are not required in such a solution. For example, if the solution is a viscous solvent, the particles can exist in the solution without being aggregated even if the side chains are not provided. Moreover, when the particles are the charged particles, it is possible to adjust the solution by using a polar solvent as the solvent. In any case, when a molecular weight of the solvent is approximated to the mass of the particles, it becomes difficult to classify the particles. Therefore, selection needs to be performed in accordance with the particles. Note that, according to the apparatus of the present invention, the particle-dispersed film can be formed by using the solution as the source material. However, the particles are not limited to the quantum dots. Any particles dispersed in the solution can be applied as a magnetic material and an optical material, etc.

Formation of Particle-Dispersed Film

First, it was confirmed that the aperture portions of the jet nozzle 4a and the skimmer nozzle 5a were not clogged, and it was confirmed that the jet nozzle 4a and the skimmer nozzle 5a are arranged coaxially with each other. The capillary 3 and the skimmer nozzle 4a were grounded, and the power supply for accelerating the ions was connected to the jet nozzle 4a. Here, while the applied voltage is selected from 0V to 10 kV (preferably, 200 to 350V), it was set at 330V here. In this case, discharging means for causing electric discharge between the jet nozzle 4a and the skimmer nozzle 5a is provided, and the voltage is adjusted. Whereby the glow discharge is caused between the jet nozzle 4a and the skimmer nozzle 5a, and the ions are made to fly in plasma thus generated. Whereby, electrolytic dissociation and fragmentation can further be promoted. FIG. 10 is a view showing a state of causing the glow discharge between the jet nozzle 4a and the skimmer nozzle 5a.

When mixed gas mainly using inert gas added with oxygen or hydrogen of several percents to 50 percents is used as a plasma atmosphere, the organic molecules coordinated in microcrystal can be removed by a reaction of radicals and the ions. At this time, by using a power source applied to the jet nozzle 4a as a fixed electric current source, a stable glow discharge can be generated. Here, a density of the discharged current was set at 0.1 to 1 A/cm$^2$. An ion sheath 4e thus formed covers the orifice of the skimmer nozzle 5a, being a cathode electrode, and continuous plasma is generated and maintained between the orifices of both of the jet nozzle 4a and the skimmer nozzle 5a, and the electrons in the plasma collide with the ions containing the flying nanocrystals. By such an electron impact, the fragmentation of the charged droplet released from the capillary tip part 3a is promoted, and the dissociation of the remaining solvent molecules and surface-coordinated molecules is promoted. Moreover, it is also effective that by applying a magnetic field between the jet nozzle 4a and the skimmer nozzle 5a, thus promoting a cyclotron motion of the electrons in the plasma, the plasma density is increased, and eventually, the number of times per unit time of the electron impact to the flying ions is increased. As a result, the ratio of the ions containing neither solvent nor surface-coordinated molecules but are singly composed of the nanocrystals is increased, and yield of the nanocrystals that can be deposited is increased. Furthermore, it is effective to use, as the gas species to be introduced from the high-pressure side of the nozzle, not only hydrogen, etc, but also etching molecules such as halogen and a halogenated compound, in etching the surfaces of the nanocrystalline ions or giving surface activity.

The droplet was formed on the capillary tip part 3a by the microsyringe 2, and in this state, by applying the voltage to the capillary tip part 3a, thereby generating the charged droplet by the ionization of the droplet, the charged droplet was emitted from the capillary tip part 3a to the nozzle. At this time, the voltage was set at 1.3 to 2.5 kV. Further, the ion beams were collimated by using the field-type ion lens 6. Here, E1 of −6 to 11 kV was applied to the field-type ion lens 6a on the skimmer side, and E2 of +0 to 5.5 kV was applied to the intermediate field-type ion lens 6b. Note that an electric potential equal to the jet nozzle 4a or less was applied to the skimmer nozzle 5a. As one embodiment, three voltages such as a voltage $\pm V_d$ of the energy separation device 71 and the voltages E1 and E2 of the field-type ion lenses were individually scanned, and the voltages were set so as to be within a range where much currents can be taken and obtain small value of voltage $\pm V_d$ (particles are not coagulated and there is a high possibility that the particles exist independently). Then, the particles were deposited on the deposited body substrate 8. Moreover, it was confirmed by the pA meter that the ion current density value indicated by the Faraday cup was 0.10 to 0.002 nA/cm$^2$.

According to the manufacturing apparatus of this embodiment, after entering the inside of the vacuum chamber from the jet nozzle 4a, the charged droplet released into the atmosphere enters the ion optics region 51 in the deposition chamber 5 from the skimmer nozzle 5a, is converged when passing through the field-type ion lens 6, enters the incoming hole 71c of the energy separation device 71, is bent by 90 degrees in the energy separation device 71, passes through the out-going hole 71d and the aperture 5b of the partition wall 5a, enters the high-vacuum region 52 in the deposition chamber, is molded by the converging electrodes 52a and 52b and the deceleration electrode 52c, and reaches the surface of the deposited body substrate 8. By the apparatus of this example, it is possible to select only the particles with the particular mass-charge ratio and deposit the particles on the surface of the deposited substrate. Accordingly, the components attributable to the solvent and the side chains can be completely removed, and a particle deposit with extremely high purity can be manufactured.

Example 3

In this example, by using the apparatus shown in FIG. 8, a magnetic recording medium was formed by using, as the particles, a ferromagnetic nanocrystalline deposit material supplied as a solution in which cobalt nanocrystals and cobalt-platinum alloy nanocrystals are dispersed in hexane, which is as disclosed in Journal of Applied Physics, 91, 1502 (2002), Journal of Applied Physics, 95, 4251 (2004), and the like. These cobalt nanocrystals and cobalt-platinum alloy nanocrystals were created by using, as source materials, cobalt chloride ($COCl_2$), bis(2-ethyl-hexyl-) sulfosuccinate, lauric acid (C12H25COOH), sodium borohydride (NaBH4), isooctane, hexane, and platinum chloride (PtC14). Both of the cobalt nanocrystals and the cobalt-platinum alloy nanocrystals, which are stably dispersed in the hexane at the normal temperature under the normal pressure, with the lauric acid as the surface-coordinated molecules, have a cylindrical shape with a crystal bottom diameter of 2 to 10 nm and a crystal length of 30 to 100 nm. In both of them, a standard deviation of the size is 0.5 nm or less. A concentration of the nanocrystals in the dispersion was set at 0.02 to 20 nmol/ml.

In the same way as Example 2, the material dispersions (sizes of the nanocrystals (bottom diameter×length): 2 nm×30 nm; 2 nm×50 nm; 5 nm×50 nm; 10 nm×100 nm) were introduced from the capillary tip part 3a to the manufacturing apparatus of the present invention. Device parameters are set similarly to the previous examples, and the cobalt nanocrystals and the cobalt-platinum alloy nanocrystals were deposited on a borosilicate glass substrate maintained at 100 to 300° C. Note that, in order to apply a vertical magnetic field (500 to 5000 Gauss) to the surface of the substrate, an air-core coil (electromagnet) with a diameter of 130 mm and a length of 100 mm is disposed on an ion beam trajectory, and the particles are deposited, while DC current is run through this air-core coil. Irrespective of the concentration of the dispersion, it was possible to form a single layer with an area occupancy ratio of 20 to 90% on the surface of the substrate.

Further, by mixing or simultaneously supplying semiconductor microcrystals as used in Examples 1 and 2 in/to the ferromagnetic nanocrystal-dispersed solution of the manufacturing apparatus of the present invention, semiconductor microcrystals and the ferromagnetic nanocrystals were deposited simultaneously on the substrate. When the image obtained by the individual ferromagnetic nanocrystal is observed, it was confirmed that by stably supporting the ferromagnetic nanocrystals by the paramagnetic semiconductor particles, an isolated magnetic domain can be formed by the individual ferromagnetic nanocrystal. Further, the same effect can be obtained by overcoating the paramagnetic material after depositing the ferromagnetic nanocrystals, or it can also be obtained by co-depositing and sputtering the paramagnetic material during depositing the nanocrystals. Here, the paramagnetic material for dividing the magnetic domains may be any one of metal and its oxide, a semiconductor and its oxide, an organic resin, a silicon resin, etc.

It was confirmed that a fringe image corresponding to a (111) lattice plane interval (0.205 to 0.227 nm) of the cobalt, the platinum, or the cobalt-platinum alloy in the deposited film observed in the image of the transmission electron microscope, is oriented in a direction perpendicular to the substrate, and the nanocrystals can be deposited, with long sides of the nanocrystals directed perpendicularly to the surface of the substrate by the magnetic field applied in the flying process of the ion beams. As a result, when the ferromagnetic nanocrystals with a bottom diameter of 2 nm was deposited at an area occupancy ratio of 90%, a so-called "perpendicular magnetic recording medium" with a recording capacity corresponding to 120 G bit/square inches could be formed, irrespective of the crystal size in the long-side direction. Generally, when the size of a single magnetic domain becomes excessively small, a "thermal fluctuation" phenomenon occurs, wherein a recording magnetic field can not be maintained even at the normal temperature, and this thermal fluctuation phenomenon hinders an improvement of a recording density. However, in the cobalt or cobalt-platinum alloy nanocrystal deposited film fabricated in this example, by making axes of the long sides (with a length of 30 to 100 nm) of the cylindrical nanocrystals oriented in a direction perpendicular to a surface of the recording medium, an occupied area (area per bit) per single magnetic domain on the surface of the magnetic recording medium can be limited to a value as extremely small as approximately 3.4 nm$^2$, and a volume of the single magnetic domain can be kept large.

Moreover, conventionally, a self-forming type method or a method of so-called patterned media has been used, for manufacturing a so-called vertical magnetic recording medium. In the self-forming method, a paramagnetic material for partitioning the magnetic domains is previously deposited together with the ferromagnetic material, which is then segregated by thermal treatment, etc. In the method of patterned media, the magnetic domains are forcibly partitioned by photolithography, etc. In these methods, the individual ferromagnetic crystallite is not necessarily isolated, and an interaction between crystallites is strong. Then, the crystallites originally becoming an information carrier of a single bit are magnetically bonded with each other, thereby forming a large magnetic domain, or limit of a size of a pattern that can be formed by the lithography is large and a practical information recording density has been limited to about 100 G bit/square inches. However, a ferromagnetic material-deposited film shown in this example uses the ferromagnetic microcrystals with a size distribution of extremely small standard deviation in advance, and is formed by depositing the ferromagnetic material microcrystals oriented in a vertical direction on a desired substrate, with its structure kept as it is. Therefore, the individual crystal is completely isolated, and each nanocrystal forms one magnetic domain, and functions as an information recording carrier of one bit. According to the apparatus of the present invention, further improvement in the recording density can be expected.

Example 4

FIG. 11 is a view showing a schematic structure of a particle deposition apparatus used in Example 4. This example is the same as Example 2 except that an electric/magnetic fields type mass separation device 72 is used as shown in FIG. 11 instead of the energy separation device 71 in the particle deposition apparatus (see FIG. 8) used in Example 2 described above. Therefore, the electric/magnetic fields type mass separation device 72 will be explained hereunder with reference to FIG. 11, and other explanation is omitted. In FIG. 11, the electric/magnetic fields type mass separation device 72 is adapted to form a magnetic field H in a direction perpendicular to the traveling direction of the particle beams. Namely, while the ion optics region 51 is connected to the high-vacuum region 52 by a cylindrical portion 5c bent at 90 degrees, a pair of sectoral magnets 72a and 72b are arranged on an outside of the cylindrical portion 5c in a relatively opposite way. In this way, the magnetic field H is formed. The electric/magnetic fields type mass separation device 72 uses electromagnetic deflection as a method of deflecting the charged particles by using a part of the cyclotron motion (circular motion made by the charged particles traveling in the magnetic field upon receiving force). In the electromagnetic deflection, a deflection amount of the charged particles depends on the mass-charge ratio, and the charged particles are more difficult to bend as the mass becomes larger. Therefore, the electromagnetic deflection is mainly used for deflecting small-mass ions and electrons. In this example, the electromagnetic deflection is utilized for the purpose of removing particularly lightweight components (solvent molecules, gas molecules, etc) other than the particles.

A function of the energy selection by the sectoral magnets according to this example is as follows. Specifically, in an even magnetic field, with regard to trajectories of the ions made incident from a direction perpendicular to the direction of the magnetic field, when the acceleration voltage (or a value corresponding thereto, which is nonrelativistically $V=mv^2/2z$) is the same, radii of the trajectories are determined in accordance with magnitudes of momenta of the ions. If the acceleration voltage is the same, mass selection can be performed by using a difference between the trajectory radii since the momentum and mass of the ions have a one-to-one correspondence relationship.

When the ions with the mass m and the charge z are accelerated in an electric field and reach the speed v [cm/s], kinetic energy of the ions, which is given by the acceleration by the voltage V, is $mv^2/2=zV$.

The ions enter an electric field H [esu] perpendicular to the motion direction of the ions, and draw an arc trajectory with a radius r. Centrifugal force $mv^2/r$ of the ions and magnetic force Hzv are balanced, and the following relationships are thereby established:

$mv^2/r=Hzv$; and $m/z=r^2H^2/(2V)$.

In a mass separation device used widely, the voltage V of each ion in the beam is constant. Accordingly, the voltage V is changed by making H constant, or the magnetic field H is changed by making V constant, thus making r constant.

The voltage v of each ion in the beam is constant in the apparatus (FIG. 8) shown in this example, and therefore the following relationship is established:

$m/z=rH/v$.

Accordingly, when the magnetic field is made to be constant, by changing the deflection radius, or when the deflection radius is made to be constant, by changing the magnetic field, the mass can be selected.

An apparatus including the cylindrical portion bent by 90 degrees, which is frequently used for the mass selection, is considered. A sectoral magnet with a rotation radius R is provided. Ions accelerated by the acceleration voltage $V_0$ are made incident onto the magnet from its outside point A, draw a circular trajectory with a radius R to rotate by 90 degrees, and reach an exit of the magnet. A distance from the point A to an entrance of the magnet is defined as L1, and a distance from the exit of the magnet to a target is defined as L2. It is assumed that, at this time, the magnetic field is adjusted so that monovalent ions with a mass mi can pass through a central trajectory.

A difference between a trajectory of ions with a mass mi+Δmi and a trajectory of ions with a mass mi is as follows:

$½(R+L2)·(Δmi/mi)$.

Example 5

FIG. 12 is a view showing a schematic structure of a particle deposition apparatus used in Example 5. This example is the same as Example 2 except that a high-frequency multipole-type mass selection apparatus 73 is used as shown in FIG. 12 instead of the energy separation device 71 in the particle deposition apparatus (see FIG. 8) used in the aforementioned Example 2. Therefore, the high-frequency multipole (here, quadrupole)-type mass separation device 73 will be explained with reference to FIG. 12, and other explanation is omitted. In FIG. 12, the high-frequency multipole-type mass separation device 73 is a device in which quadrupole selection electrodes 73a, 73b, 73c and 73d are provided in front of the partition wall 5a that partitions the ion optics region 51 and the high-vacuum region 52. A pair of the electrodes 73a and 73b are arranged so as to be opposed to each other in the vertical direction in FIG. 12, and the other pair of electrodes 73c and 73d are arranged so as to be opposed to each other in a direction perpendicular to a paper in FIG. 12, thus forming a cylindrical body having a quadrangular shape in cross section by these four electrodes 73a, 73b, 73c and 73d, so that the particle beams pass through an inside of the cylindrical body. Moreover, by applying a high-frequency electric field of +{U+Vcos (ωT)} to the electrodes 73a and 73b, and applying a high-frequency electric field of −{U+Vcos (ωT)} to the electrodes 73c and 73d, a traveling direction of the particles is changed in accordance with the energy of the passing particle beams, to allow only the particles with constant energy to travel straight to be deposited on the substrate 8. Note that a principle of the mass selection by the quadrupole selection electrodes is a well-known principle used in so-called mass analysis by the quadrupole selection (for example, see ISHIKAWA Junzo, "*Kaden Ryushi Biimu*

Kogaku(Charged Particle Beam Engineering)", p. 125, Corona Publishing Co., Ltd., etc).

INDUSTRIAL APPLICABILITY

The present invention can be utilized as the particle deposition apparatus and the particle-deposited film manufacturing method, which deposit the particles on the substrate, etc, in the case of manufacturing the inorganic film, such as the semiconductor film, the magnetic film and the optical film, on which the particles such as the nanocrystals and the magnetic particles are uniformly dispersed, or as the manufacturing method of the light-emitting device.

EXPLANATION OF REFERENCE NUMERALS

Figure 1:
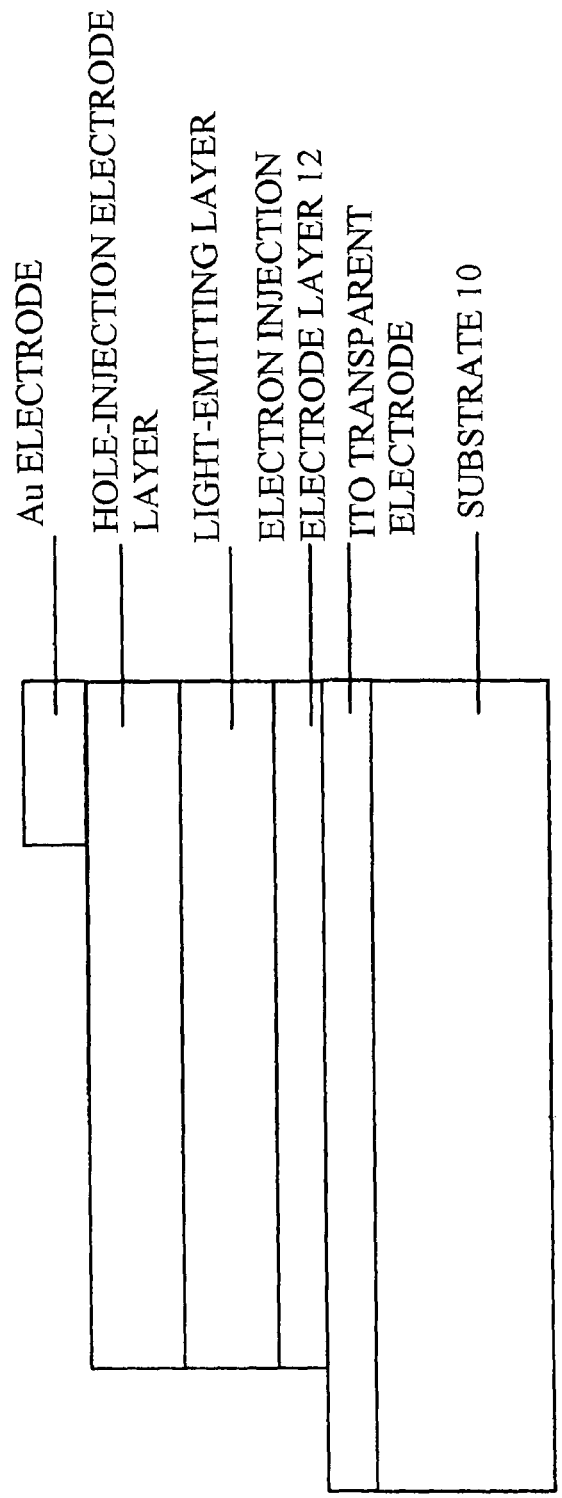
FIG. 1 is a cross-sectional view showing a light-emitting diode according to an embodiment of the present invention.
Figure 2:
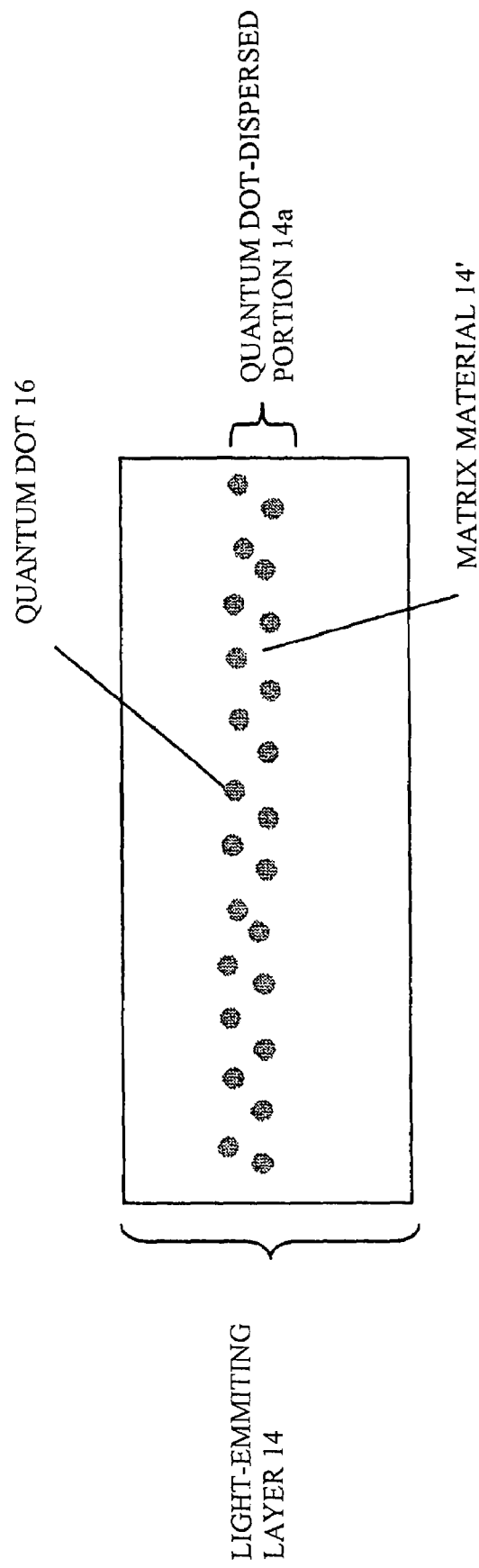
FIG. 2 is a cross-sectional view showing a particle-dispersed film (light-emitting layer 14 in FIG. 1) according to the embodiment of the present invention.
Figure 3:
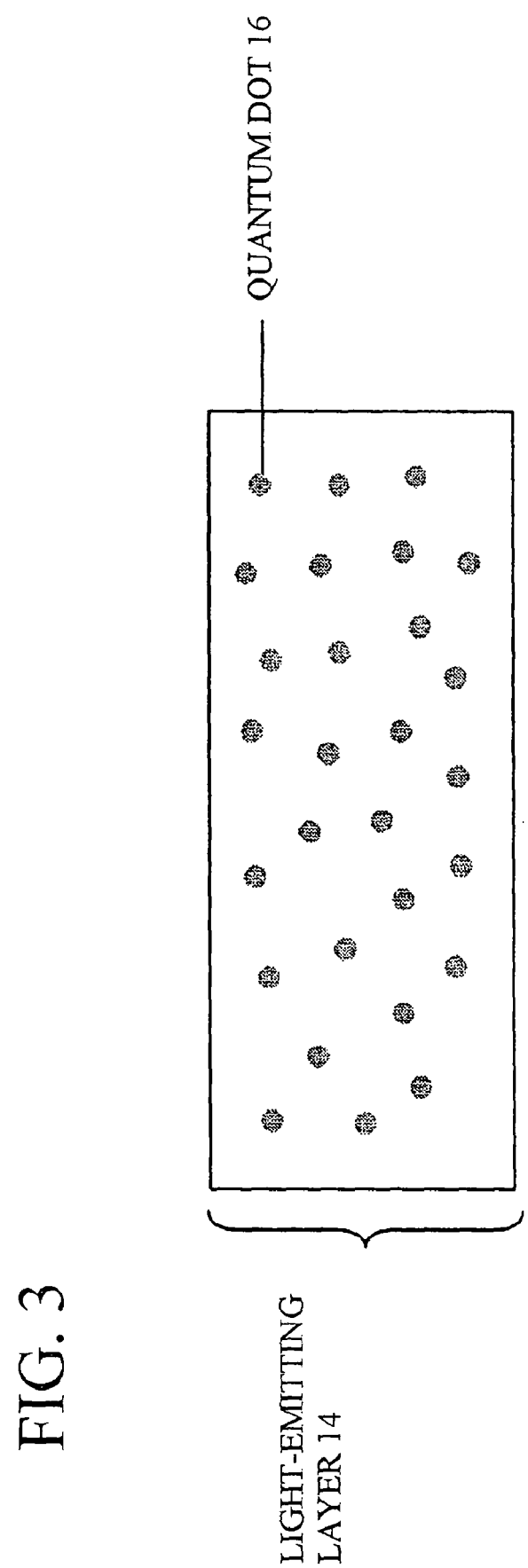
FIG. 3 is a cross-sectional view showing a particle-dispersed film (light-emitting layer 14 in FIG. 1) according to the embodiment of the present invention.
Figure 4:
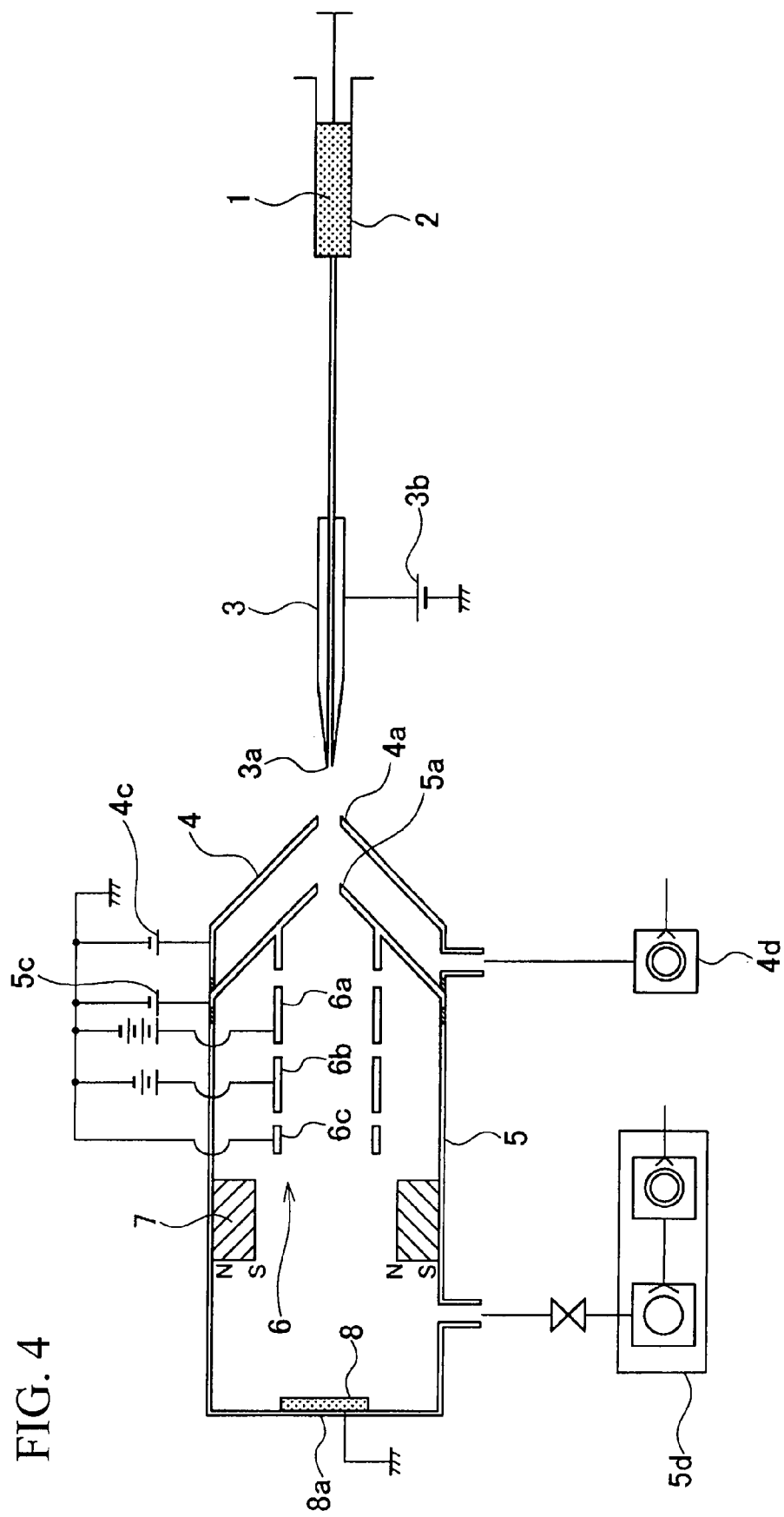
FIG. 4 is a schematic view showing a particle-dispersed film manufacturing apparatus according to the embodiment of the present invention.
Figure 5:
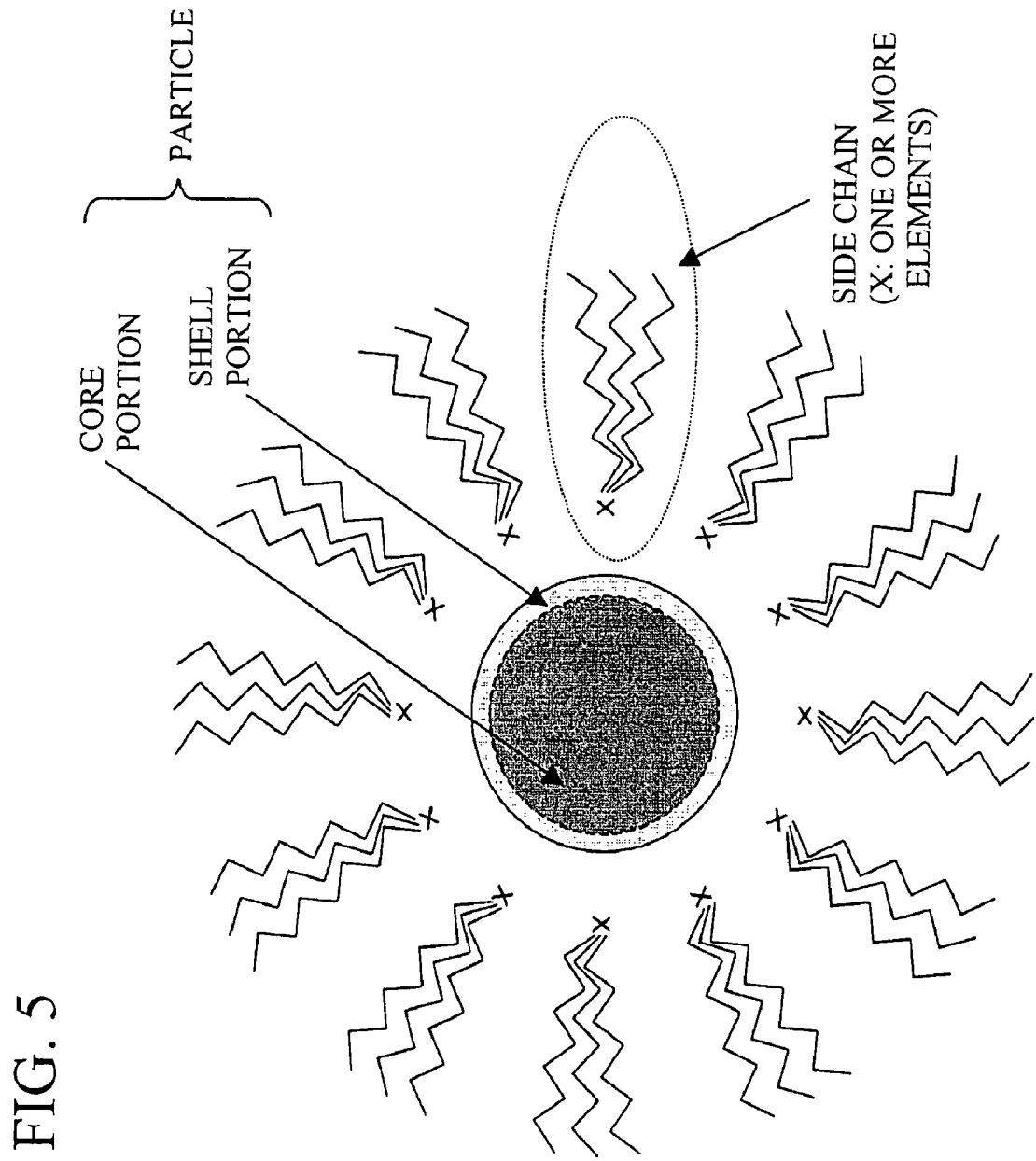
FIG. 5 is a schematic diagram showing a particle material for use in the embodiment of the present invention.
Figure 6:
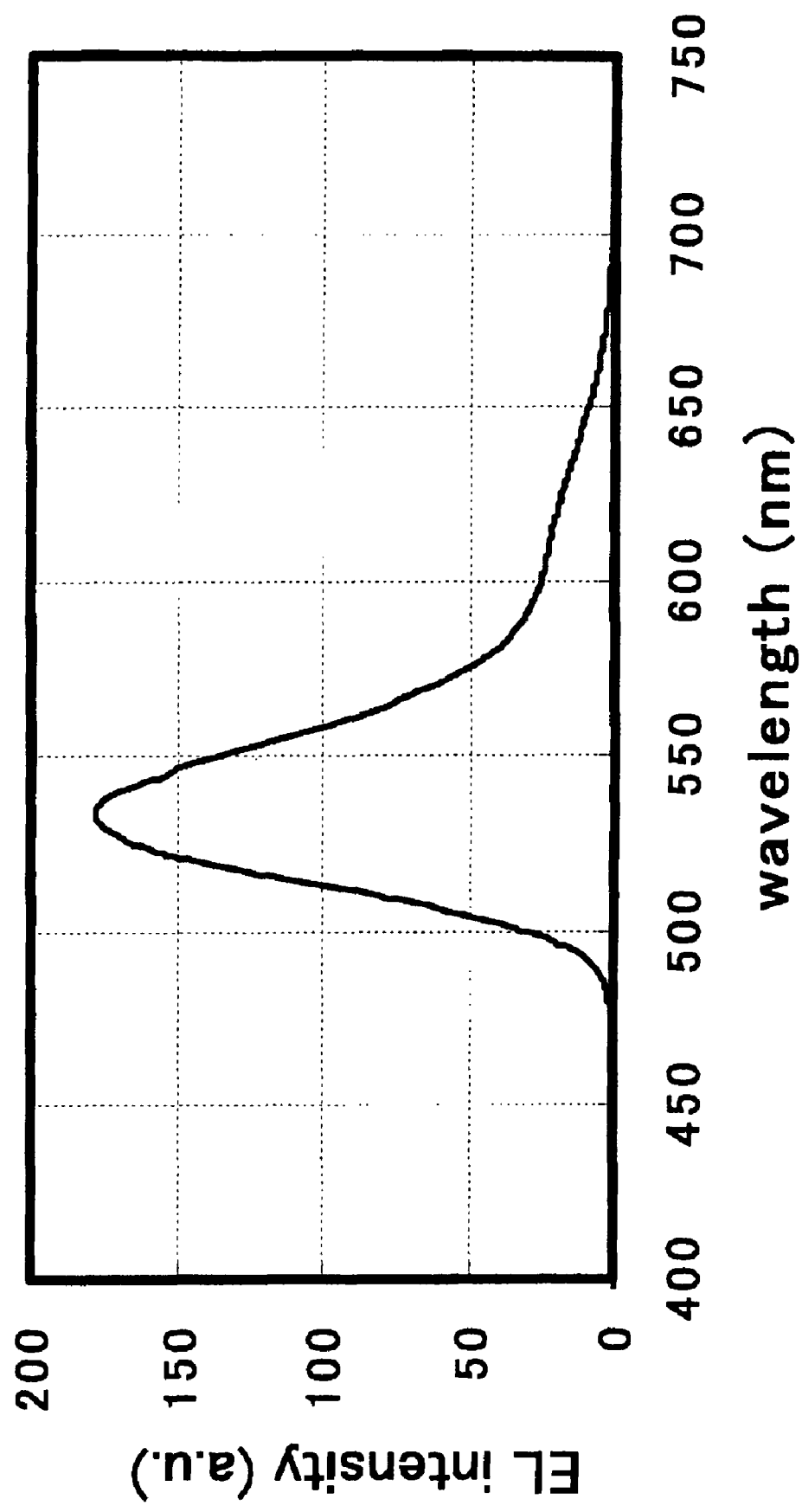
FIG. 6 shows light-emitting characteristics of a device prepared in the embodiment of the present invention.
Figure 7:
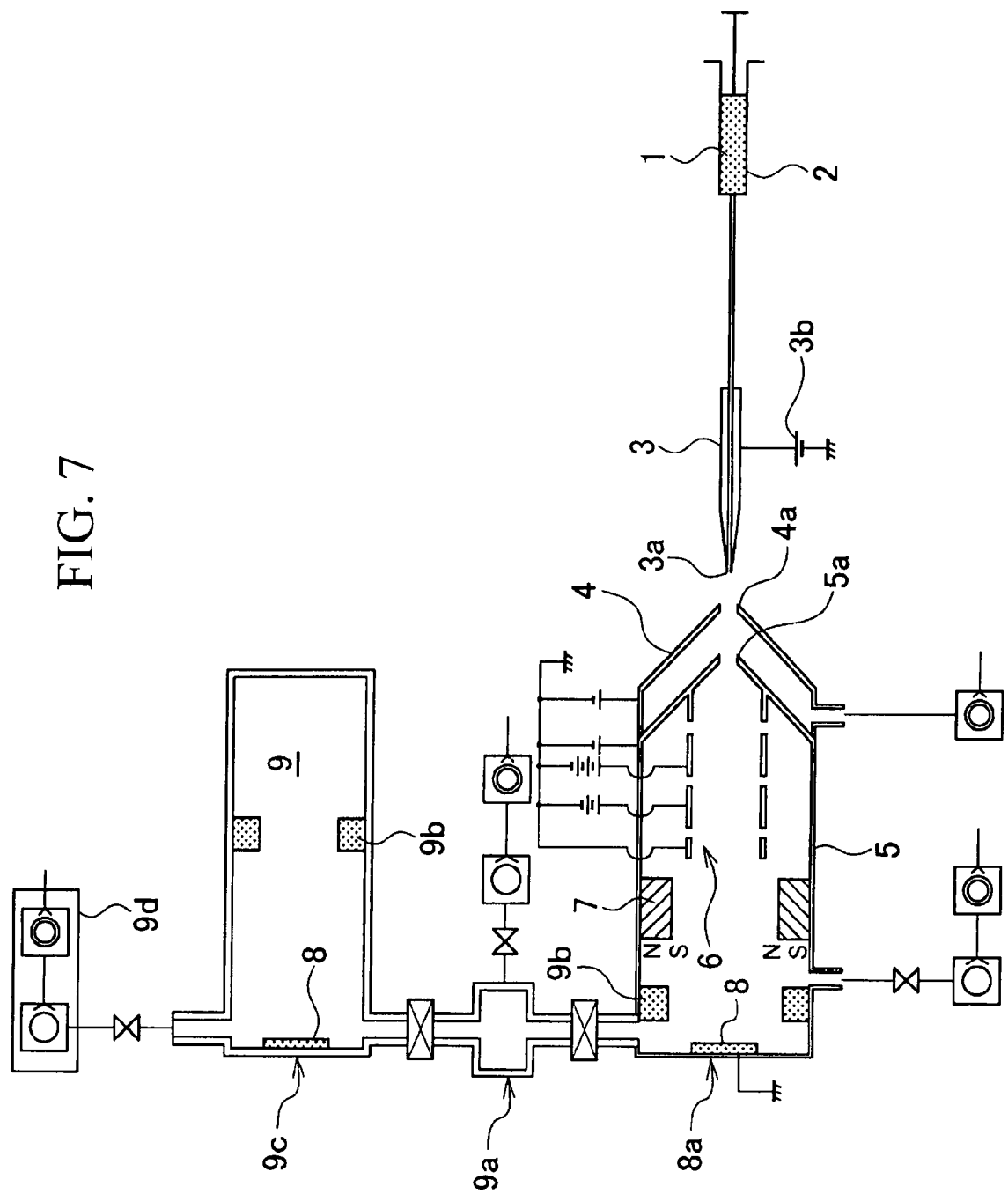
FIG. 7 is a schematic view showing a particle-dispersed film manufacturing apparatus used in Example 1.
Figure 8:
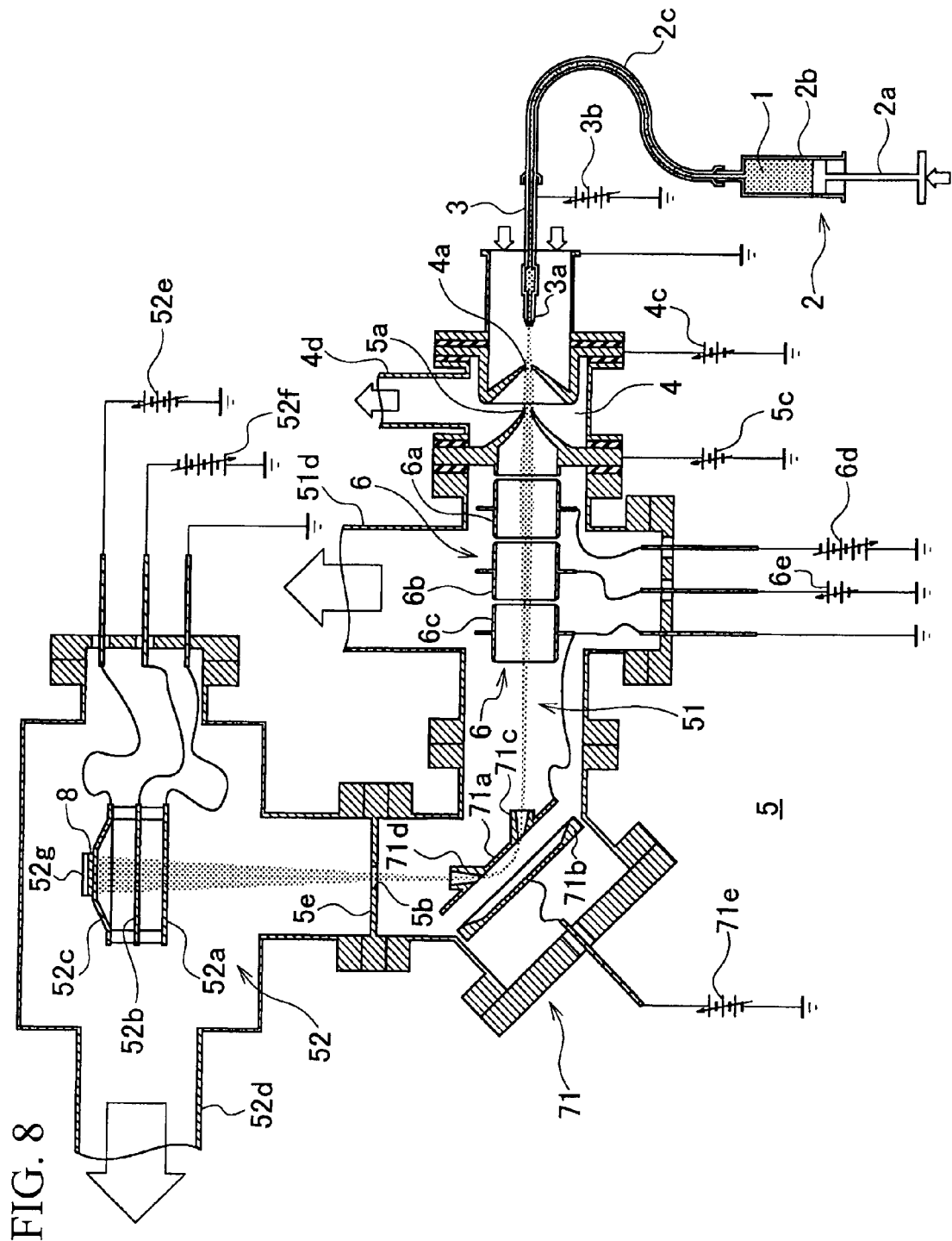
FIG. 8 is a schematic view showing a particle deposition apparatus used in Example 2.
Figure 9:
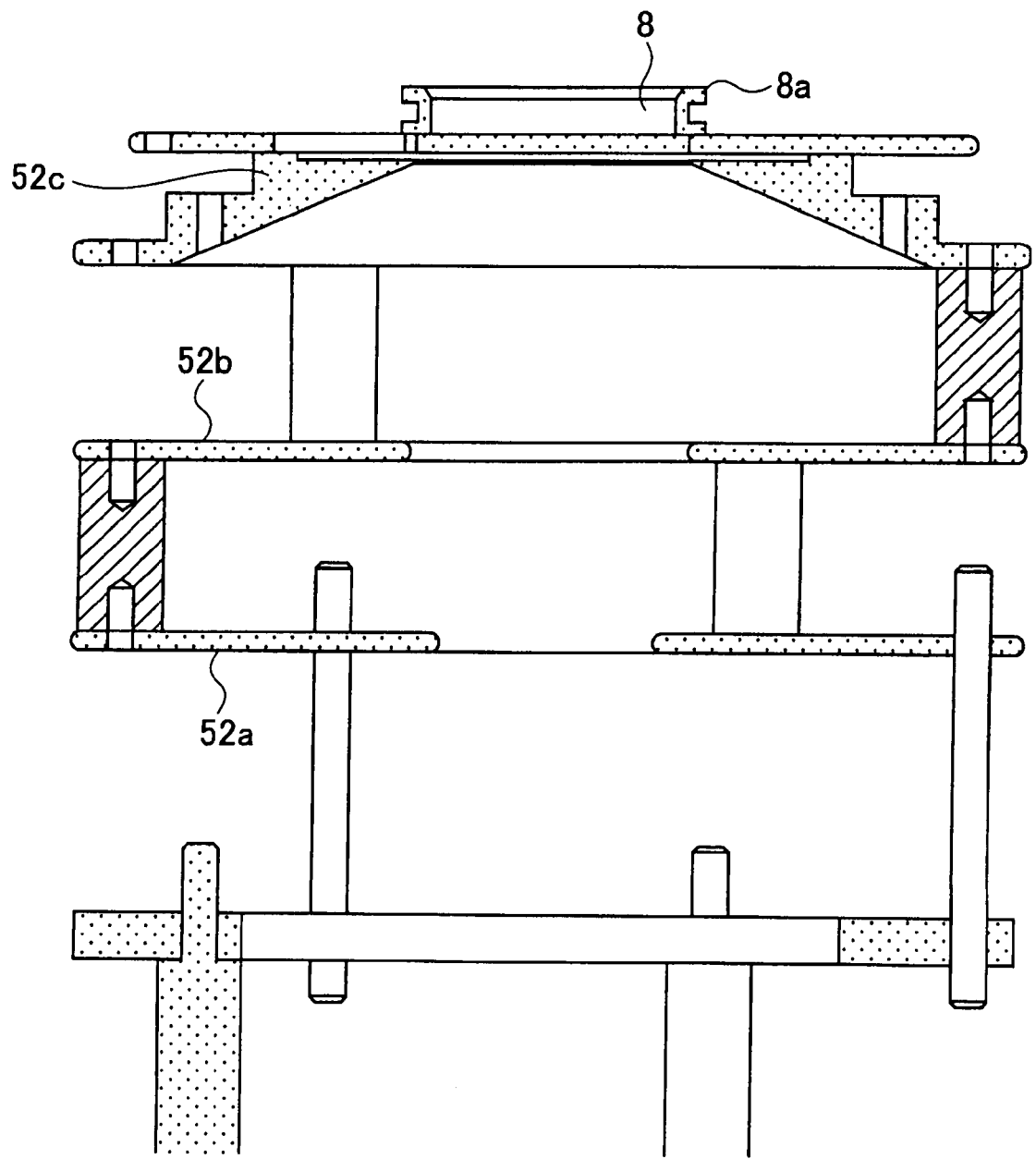
FIG. 9 is a partially enlarged view of the particle deposition apparatus used in Example 2.
Figure 10:
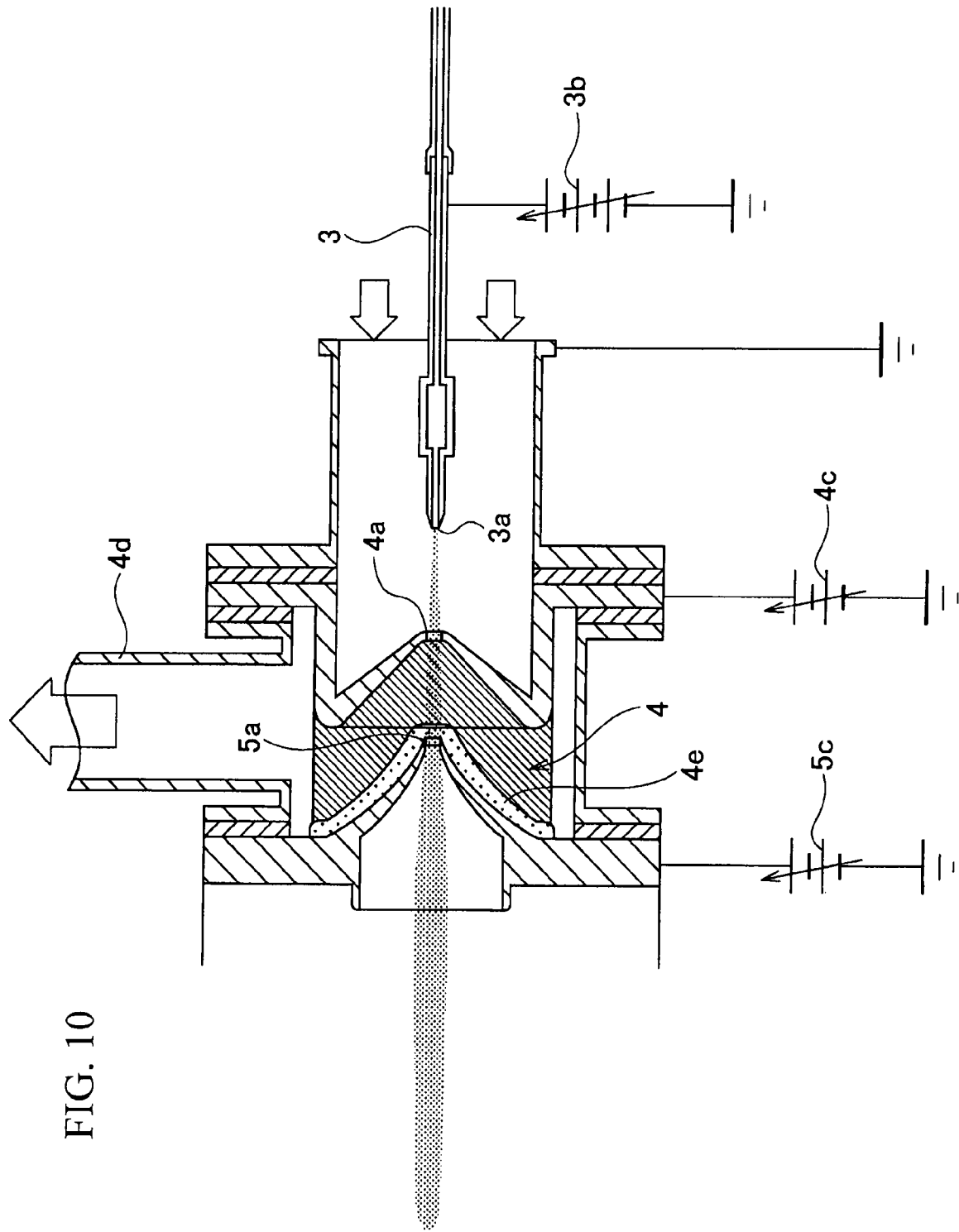
FIG. 10 is a partially enlarged view of the particle deposition apparatus used in Example 2.
Figure 11:
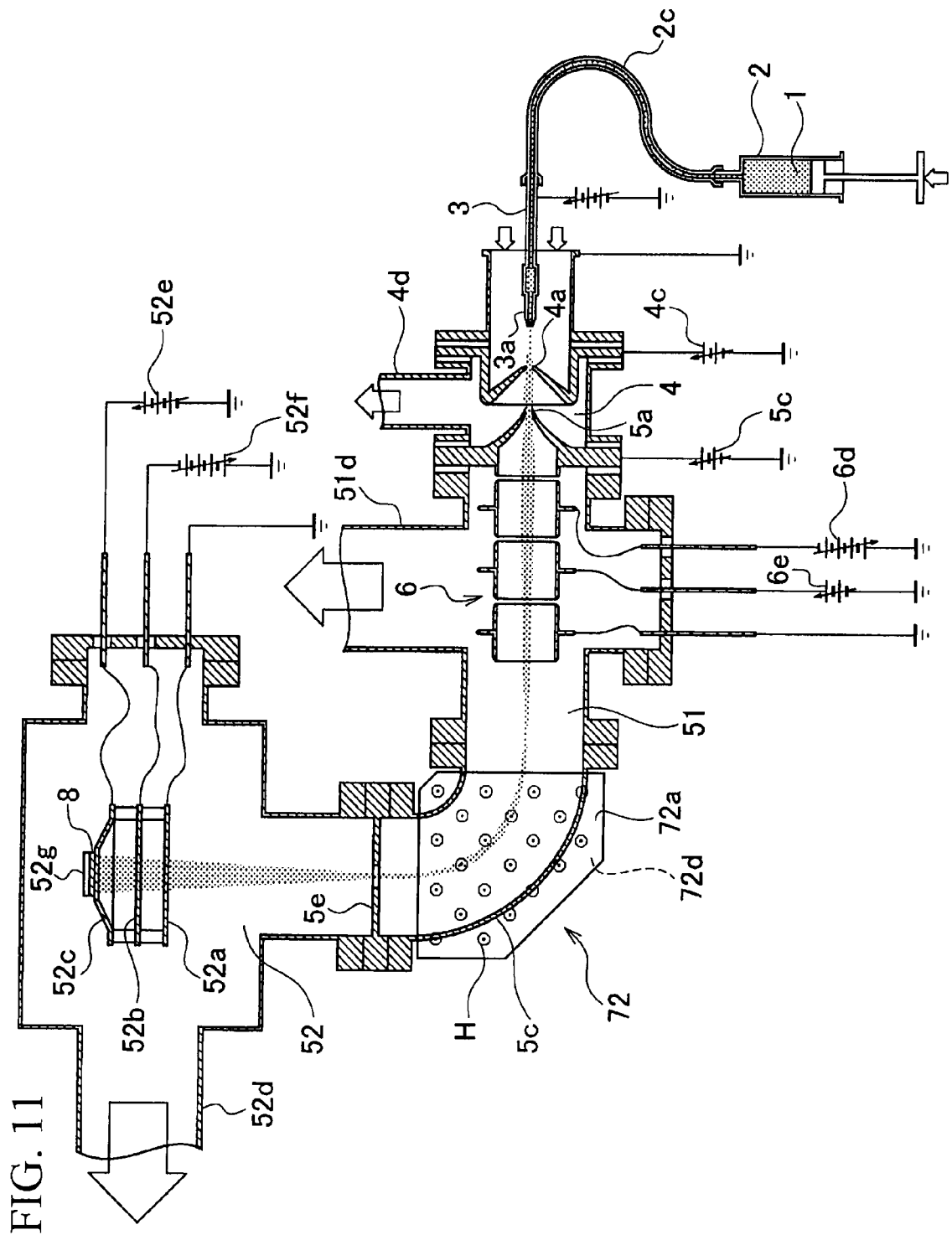
FIG. 11 is a schematic view showing a particle deposition apparatus used in Example 4.
Figure 12:
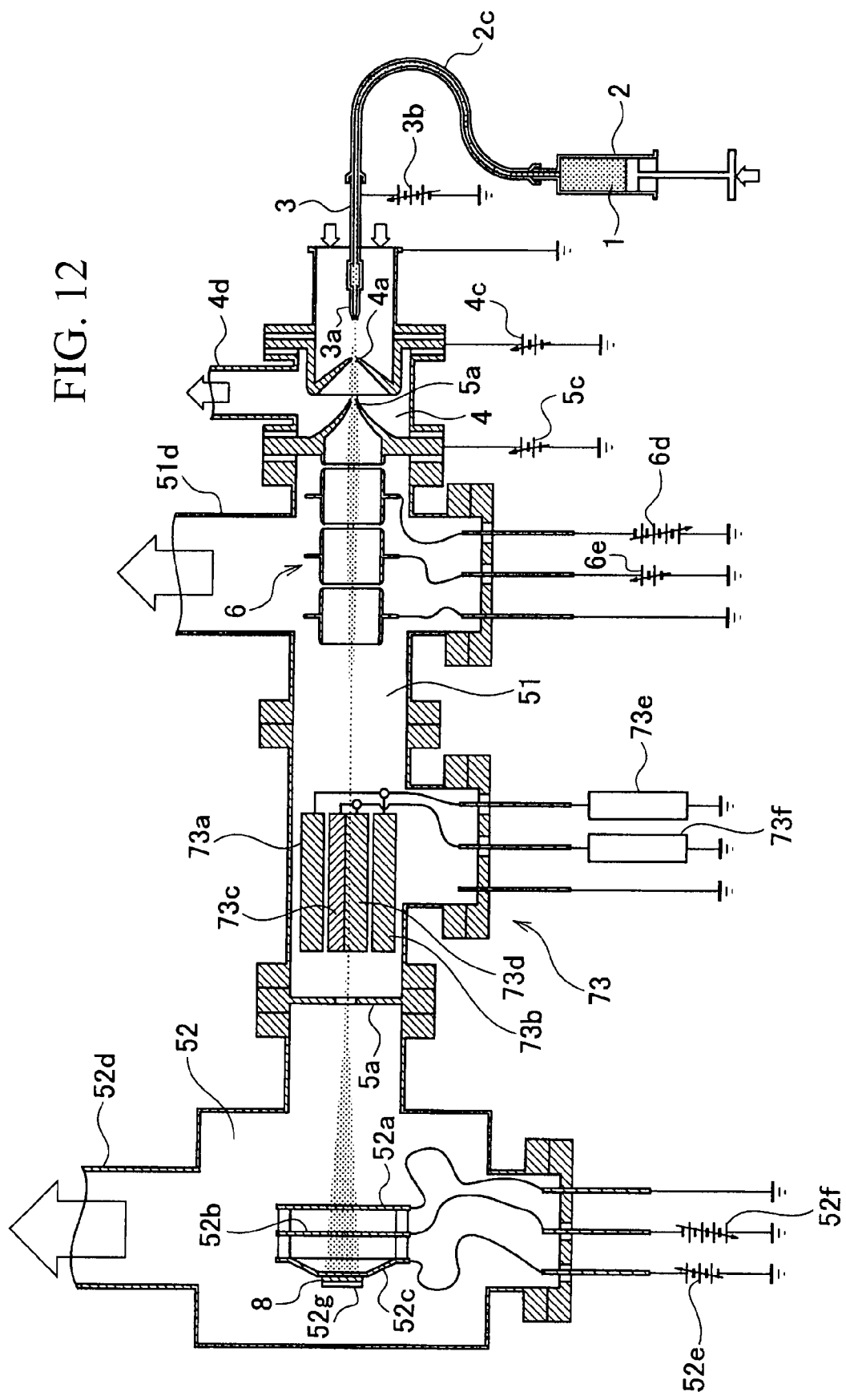
FIG. 12 is a schematic view showing a particle deposition apparatus used in Example 5.

1 PARTICLE-DISPERSED SOLUTION
2 SYRINGE PUMP
3 CAPILLARY
3a CAPILLARY TIP PART
4 VACUUM CHAMBER
4a JET NOZZLE
5 DEPOSITION CHAMBER
5a SKIMMER NOZZLE
6 FIELD-TYPE ION LENS
8 DEPOSITED SUBSTRATE
10 SUBSTRATE (GLASS SUBSTRATE)
12 n-TYPE ELECTRODE (ELECTRON-INJECTED ELECTRODE)
14 LIGHT-EMITTING LAYER
14a QUANTUM DOT-DISPERSED PORTION
16 QUANTUM DOT
18 p-TYPE ELECTRODE (HOLE-INJECTED ELECTRODE)
51 ION OPTICS REGION
52 HIGH-VACUUM REGION
71, 72, 73 ENERGY SEPARATION DEVICE

The invention claimed is:

1. A particle deposition apparatus for depositing particles on a deposited body by using a solution, with particles dispersed in a solvent, as a source material, comprising:
    a solution supply device that supplies the source material;
    a charging device that electrically charges the source material;
    a vacuum chamber into which the source material jetted from the solution supply device can be introduced through a jet nozzle, the vacuum chamber having a vacuum chamber evacuation port for setting a pressure inside the vacuum chamber to a pressure lower than atmospheric pressure; and
    a deposition chamber, which is adjoined to the vacuum chamber, into which the source material emitted from the vacuum chamber can be introduced through a skimmer nozzle, the deposition chamber having
        a deposition chamber evacuation port for setting a pressure inside of the deposition chamber to a pressure that is lower than the pressure inside the vacuum chamber, and
        a separation device that selects only particles having a particular mass-to-charge ratio from the source material and deposits the selected particles on the deposited body; wherein
    the pressure inside the deposition chamber is less than the pressure inside the vacuum chamber, and the pressure inside the vacuum chamber is less than atmospheric pressure.

2. The particle deposition apparatus according to claim 1, wherein the deposition chamber comprises:
    lens devices that collimate the source material electrically charged by the charging device; wherein
    the separation device applies an electric field or a magnetic field to the source material collimated by the lens devices, and allows only the particles having the particular mass-to-charge ratio to travel in a direction of the deposited body so as to be deposited thereon.

3. The particle deposition apparatus according to claim 1, wherein the charging device is a voltage applying unit that sets the solution supply device into a defined electric potential.

4. The particle deposition apparatus according to claim 1, wherein the charging device is a discharge voltage applying unit that applies a discharge voltage between the jet nozzle and the skimmer nozzle, to set the inside of the vacuum chamber to an electric discharge area.

5. The particle deposition apparatus according to claim 1, wherein the separation device is an electrostatic energy separation device which is a trajectory deflection energy separation device using an electric field generating means.

6. The particle deposition apparatus according to claim 1, wherein the separation device is an electromagnetic field mass separation device which is a trajectory deflection mass separation device using a magnetic field generating means or an orthogonal electric and magnetic fields generating means.

7. The particle deposition apparatus according to claim 1, wherein the separation device is a multipole mass separation device.

8. The particle deposition apparatus according to claim 1, comprising a particle deceleration device that decelerates the particles traveling toward the deposited body from the separation device.

9. The particle deposition apparatus according to claim 8, comprising a particle converging device that converges the particles decelerated by the particle deceleration device and deposits the particles on the deposited body.

10. The particle deposition apparatus according to claim 1, wherein the deposition chamber is divided into
an ion optics region in which the separation device is disposed and a high vacuum region in which the deposited body is disposed; the regions are partitioned by a partition wall having an aperture for allowing the particles to pass through; an evacuation device is provided for setting each region at a desired pressure; and a pressure in the high vacuum region is less than the pressure in the ion optics region.

11. The particle deposition apparatus according to claim 1, wherein the pressure inside the deposition chamber is $1 \times 10^{-6}$ Torr or less.

12. A method for manufacturing a semiconductor particle deposit, comprising the step of:
depositing semiconductor particles on a deposited body by using a solution, with particles dispersed in a solvent, and by using the particle deposition apparatus according to claim 1.

13. A method for manufacturing a particle deposit for depositing particles on a deposited body by using a solution, with particles dispersed in a solvent, as a source material, comprising the steps of:
jetting the source material from a solution supply device, and electrically charging the source material;
introducing the source material into a vacuum chamber by passing the source material through a jet nozzle equipped on the vacuum chamber, wherein the pressure inside of the vacuum chamber is at a pressure that is less than atmospheric pressure;
introducing a jet flow that travels in the vacuum chamber, through a skimmer nozzle, which is equipped in between the vacuum chamber and a deposition chamber, wherein the pressure inside the deposition chamber is less than the pressure inside the vacuum chamber, and the vacuum chamber adjoins the deposition chamber; and
selecting only particles having a particular mass-to-charge ratio from the source material and depositing the selected particles on the deposited body disposed inside the deposition chamber.

14. The method for manufacturing a particle deposit according to claim 13, wherein a capillary is used as the solution supply device, and the step of charging the source material is the step of jetting the solution into an atmosphere of atmospheric pressure from a tip part of the capillary as liquid droplets, and charging the liquid droplets jetted from the tip part of the capillary by setting the capillary into a prescribed electric potential.

15. The method for manufacturing a particle deposit according to claim 13, wherein the step of electrically charging the source material is the step of setting the inside of the vacuum chamber to an electric discharge area and allowing the source material to pass through the vacuum chamber.

16. The method for manufacturing a particle deposit according to claim 13, wherein the pressure inside the deposition chamber is $1 \times 10^{-6}$ Torr or less.

* * * * *